(12) United States Patent
Rosen et al.

(10) Patent No.: US 11,330,682 B2
(45) Date of Patent: *May 10, 2022

(54) SELF AWARE LIGHTS THAT SELF-CONFIGURE

(71) Applicant: Resilience Magnum IP, LLC, Cleveland, OH (US)

(72) Inventors: Steven Rosen, Hunting Valley, OH (US); Ronald Cozean, Madison, CT (US); Eric Allen, Long Beach, CA (US); David Edward Mordetzky, Oak Park, CA (US); Megan Horvath, Cleveland, OH (US); Anthony John Pyros, Cleveland, OH (US); John Elwood, Santa Ana, CA (US); Michael Chang, Long Beach, CA (US); Elie Attarian, Chatsworth, CA (US)

(73) Assignee: RESILIENCE MAGNUM IP, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,627

(22) Filed: Jan. 10, 2020

(65) Prior Publication Data

US 2020/0153906 A1 May 14, 2020

Related U.S. Application Data

(63) Continuation of application No. 16/043,798, filed on Jul. 24, 2018.

(Continued)

(51) Int. Cl.
*H04L 29/08* (2006.01)
*G05B 13/02* (2006.01)
(Continued)

(52) U.S. Cl.
CPC ......... *H05B 45/00* (2020.01); *G05B 13/0265* (2013.01); *H04L 67/12* (2013.01);
(Continued)

(58) Field of Classification Search
CPC .. H05B 37/02; H05B 37/0227; H05B 37/029; H04L 12/28; H04L 12/281; H04L 12/2816
(Continued)

(56) References Cited

U.S. PATENT DOCUMENTS 6,147,624 A 11/2000 Clapper
6,236,303 B1 5/2001 Wagner et al.
(Continued)

FOREIGN PATENT DOCUMENTS

CN 105371177 A 3/2016
CN 105959380 A 9/2016

OTHER PUBLICATIONS

U.S. Appl. No. 16/043,798, filed Jul. 24, 2018.
(Continued)

*Primary Examiner* — Daryl C Pope
(74) *Attorney, Agent, or Firm* — Amin, Turocy & Watson, LLP

(57) ABSTRACT

Techniques for self-aware light are provided. A self-aware light can determine characteristics of the environment in which the self-aware light is installed, determine capabilities of self-aware light, determine one or more objectives of the installation of self-aware light, perform a self-configuration of self-aware light according to the determined one or more objectives, and determine and execute suitable actions for self-aware light to perform to achieve the determined one or more objectives.

20 Claims, 14 Drawing Sheets

Related U.S. Application Data

(60) Provisional application No. 62/568,294, filed on Oct. 4, 2017.

(51) Int. Cl.
*H05B 45/00* (2020.01)
*H05B 47/105* (2020.01)
*H05B 47/175* (2020.01)
*H04L 67/12* (2022.01)
*H05B 47/125* (2020.01)

(52) U.S. Cl.
CPC ......... *H05B 47/105* (2020.01); *H05B 47/175* (2020.01); *H05B 47/125* (2020.01)

(58) Field of Classification Search
USPC .................................... 340/3.1, 286.02, 506
See application file for complete search history.

(56) References Cited

U.S. PATENT DOCUMENTS

| | | | |
|---|---|---|---|
| 6,528,954 B1* | 3/2003 | Lys | ..................... A61N 5/0616 315/291 |
| 6,946,974 B1 | 9/2005 | Racunas Jr. | |
| 7,026,954 B2 | 4/2006 | Slemmer et al. | |
| 7,111,952 B2 | 9/2006 | Veskovic | |
| 7,824,065 B2 | 11/2010 | Maxik | |
| 8,280,558 B2 | 10/2012 | Picco | |
| 8,283,812 B2 | 10/2012 | Azancot et al. | |
| 8,362,713 B2 | 1/2013 | Recker et al. | |
| 8,545,033 B2 | 10/2013 | Gielen | |
| 8,600,786 B2 | 12/2013 | Stefik et al. | |
| 8,674,616 B2 | 3/2014 | Holman et al. | |
| 8,950,461 B2 | 2/2015 | Adams et al. | |
| 9,367,050 B2 | 6/2016 | Jain et al. | |
| 9,560,388 B2 | 1/2017 | Ogle et al. | |
| 9,594,956 B2 | 3/2017 | Cohen et al. | |
| 9,595,193 B1 | 3/2017 | Duale et al. | |
| 9,601,018 B2 | 3/2017 | Cogill et al. | |
| 9,644,799 B2 | 5/2017 | Crayford et al. | |
| 9,700,641 B2 | 7/2017 | Hawkins et al. | |
| 9,893,551 B2 | 2/2018 | Cheatham, III et al. | |
| 9,938,765 B2 | 4/2018 | Berman et al. | |
| 10,210,355 B1 | 2/2019 | Lai | |
| 10,251,242 B1 | 4/2019 | Rosen et al. | |
| 10,574,757 B2 | 2/2020 | Rosen et al. | |
| 10,677,402 B2 | 6/2020 | Rosen et al. | |
| 10,867,486 B2 | 12/2020 | Rosen et al. | |
| 2002/0171562 A1 | 11/2002 | Muraki | |
| 2004/0022058 A1 | 2/2004 | Birrell | |
| 2005/0128751 A1 | 6/2005 | Roberge et al. | |
| 2005/0248299 A1 | 11/2005 | Chemel et al. | |
| 2006/0044798 A1 | 3/2006 | Pazula | |
| 2006/0197684 A1 | 9/2006 | Tremblay | |
| 2008/0191009 A1 | 8/2008 | Gressel et al. | |
| 2009/0059603 A1 | 3/2009 | Recker et al. | |
| 2009/0303079 A1 | 12/2009 | Khim | |
| 2010/0007525 A1 | 1/2010 | Shanbhag et al. | |
| 2010/0060485 A1 | 3/2010 | Kim | |
| 2010/0309024 A1 | 12/2010 | Mimeault | |
| 2011/0006893 A1 | 1/2011 | Finch et al. | |
| 2011/0193872 A1 | 8/2011 | Biernath et al. | |
| 2012/0011033 A1 | 1/2012 | Salgia | |
| 2012/0066144 A1 | 3/2012 | Berkvens et al. | |
| 2012/0092192 A1 | 4/2012 | Wong | |
| 2012/0098655 A1* | 4/2012 | Preta | ........................ B60Q 1/44 340/438 |
| 2013/0002587 A1 | 1/2013 | Biggs et al. | |
| 2013/0073350 A1 | 3/2013 | Blustein | |
| 2013/0113936 A1 | 5/2013 | Cohen et al. | |
| 2013/0300911 A1 | 11/2013 | Beckman | |
| 2014/0049963 A1* | 2/2014 | McGuire | ................. F21K 9/232 362/249.01 |
| 2014/0049972 A1* | 2/2014 | McGuire | ................... F21K 9/23 362/427 |
| 2014/0055990 A1 | 2/2014 | Reed | |
| 2014/0217914 A1* | 8/2014 | Maxik | ................... H05B 45/20 315/210 |
| 2014/0262057 A1 | 9/2014 | Chambers et al. | |
| 2015/0195100 A1 | 7/2015 | Imes et al. | |
| 2015/0286938 A1 | 10/2015 | Blair et al. | |
| 2016/0047164 A1 | 2/2016 | Lundy et al. | |
| 2016/0085884 A1 | 3/2016 | Schafer et al. | |
| 2016/0135271 A1 | 3/2016 | Alexander | |
| 2016/0104325 A1 | 4/2016 | Lu | |
| 2016/0216443 A1 | 7/2016 | Morgan et al. | |
| 2016/0359325 A1 | 12/2016 | Kawata et al. | |
| 2017/0073074 A1 | 3/2017 | Gagnon et al. | |
| 2017/0094756 A1 | 3/2017 | Saffari | |
| 2017/0192406 A1 | 7/2017 | Ashdown et al. | |
| 2017/0247289 A1 | 8/2017 | Waldschmidt et al. | |
| 2017/0322350 A1 | 11/2017 | Montagne | |
| 2018/0096634 A1 | 4/2018 | Walker et al. | |
| 2018/0154032 A1 | 6/2018 | Dombrovsky | |
| 2018/0156429 A1 | 6/2018 | Carlet et al. | |
| 2018/0163934 A1 | 6/2018 | Miller | |
| 2018/0167516 A1 | 6/2018 | Warrick | |
| 2018/0211503 A1 | 7/2018 | Baliga et al. | |
| 2018/0216791 A1 | 8/2018 | Leung et al. | |
| 2018/0224596 A1 | 8/2018 | Creasman et al. | |
| 2018/0259141 A1 | 9/2018 | Yamaguchi et al. | |
| 2018/0313660 A1 | 11/2018 | Eyster et al. | |
| 2019/0069379 A1 | 2/2019 | Kastee et al. | |
| 2019/0104181 A1* | 4/2019 | Rosen | .................. H05B 47/105 |

OTHER PUBLICATIONS

Non-Final Office Action received for U.S. Appl. No. 16/044,047 dated Dec. 26, 2018, 22 pages.
Notice of Allowance received for U.S. Appl. No. 16/044,073 dated Nov. 8, 2018, 20 pages.
Non-Final Office Action received for U.S. Appl. No. 16/043,974 dated May 2, 2019, 28 pages.
Non-Final Office Action received for U.S. Appl. No. 16/043,798 dated Jun. 27, 2019, 15 pages.
Non-Final Office Action received for U.S. Appl. No. 16/130,720 dated Jul. 25, 2019, 37 pages.
Non-Final Office Action received for U.S. Appl. No. 16/270,646 dated Aug. 21, 2019, 29 pages.
Non-Final Office Action received for U.S. Appl. No. 16/544,023 dated Apr. 9, 2020, 28 pages.
Non-Final Office Action received for U.S. Appl. No. 16/043,997 dated Apr. 8, 2020, 46 pages.
Non-Final Office Action received for U.S. Appl. No. 16/821,007 dated May 1, 2020, 36 pages.
Non-Final Office Action received for U.S. Appl. No. 16/044,027 dated Jun. 22, 2020, 48 pages.
Notice of Allowance received for U.S. Appl. No. 16/043,949 dated May 21, 2020, 49 pages.
Non-Final Office Action received for U.S. Appl. No. 16/043,875 dated May 27, 2020, 15 pages.
Non-Final Office Action received for U.S. Appl. No. 16/043,875 dated Jul. 8, 2020, 36 pages.
Notice of Allowance received for U.S. Appl. No. 16/043,997 dated Aug. 7, 2020, 46 pages.
Non-Final Office Action received for U.S. Appl. No. 16/856,434 dated Sep. 1, 2020, 50 pages.
Final Office Action received for U.S. Appl. No. 16/044,027 dated Oct. 8, 2020, 29 pages.
Final Office Action received for U.S. Appl. No. 16/682,085 dated Oct. 28, 2020, 27 pages.
Final Office Action received for U.S. Appl. No. 16/682,085 dated Oct. 8, 2020, 29 pages.
Final Office Action received for U.S. Appl. No. 16/043,875 dated Jan. 25, 2020, 13 pages.
Non-Final Office Action received for U.S. Appl. No. 17/099,928 dated Jun. 24, 2021, 53 pages.
Notice of Allowance received for U.S. Appl. No. 17/005,534 dated Aug. 4, 2021, 50 pages.

(56) References Cited

OTHER PUBLICATIONS

Notice of Allowance received for U.S. Appl. No. 17/062,929 dated Aug. 9, 2021, 27 pages.
Non-Final Office Action received for U.S. Appl. No. 16/043,875 dated May 26, 2021, 45 pages.
Non-Final Office Action received for U.S. Appl. No. 16/044,027 dated Jun. 9, 2021, 29 pages.
Non-Final Office Action received for U.S. Appl. No. 17/062,929 dated May 5, 2021, 38 pages.
Non-Final Office Action received for U.S. Appl. No. 17/099,898 dated Sep. 24, 2021, 68 pages.
Non-Office Action received for U.S. Appl. No. 17/036,417 dated Mar. 30, 2022, 61 pages.

* cited by examiner

US 11,330,682 B2

SELF AWARE LIGHTS THAT SELF-CONFIGURE

CROSS-REFERENCE TO RELATED APPLICATIONS

This application is a continuation of, and claims priority to each of, U.S. patent application Ser. No. 16/043,798, filed on Jul. 24, 2018, entitled "SELF AWARE LIGHTS THAT SELF-CONFIGURE", and now issued as U.S. Pat. No. 10,574,757, which claims the benefit of U.S. Provisional Patent Application Ser. No. 62/568,294 filed on Oct. 4, 2017, entitled "SELF AWARE LIGHTS THAT SELF-CONFIGURE." The entireties of the aforementioned applications are hereby incorporated herein by reference.

BACKGROUND

The subject disclosure relates generally to smart lights.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate a self-aware light performing self-configuration are described.

According to an embodiment, a self-aware light bulb is provided. The self-aware light bulb comprises one or more instruments, a memory that stores computer executable components, and a processor that executes the computer executable components stored in the memory. The computer executable components can comprise: an environment component that employs at least one instrument of the one or more instruments to generate an environment profile describing one or more characteristics of an environment in which self-aware light bulb is installed; and an awareness component that: generates one or more objectives for the self-aware bulb based on the environment profile and one or more capabilities of the self-aware light bulb; and configures at least one setting of at least one parameter of the self-aware light bulb to achieve the one or more objectives.

In another embodiment, a self-aware light is provided. The self-aware light comprises a self-aware light fixture, a self-aware light bulb configured for installation in the self-aware light fixture, one or more instruments located in at least one of the self-aware light bulb or the self-aware light fixture, a memory that stores computer executable components, and a processor that executes the computer executable components stored in the memory. The computer executable components can comprise: an environment component that employs at least one instrument of the one or more instruments to determine one or more characteristics of an environment in which self-aware light is installed; and an awareness component that: determines one or more capabilities of the self-aware light; generates one or more objectives for the self-aware bulb based on the one or more characteristics and the one or more capabilities; and configures at least one setting of at least one parameter of the self-aware light to achieve the one or more objectives.

In another embodiment, a method comprises: determining, by a self-aware light bulb via one or more instruments of the self-aware light bulb, one or more characteristics of an environment in which self-aware light bulb is installed; determining, by the self-aware light bulb, one or more capabilities of the self-aware light; generating, by the self-aware light bulb, one or more objectives for the self-aware bulb based on the one or more characteristics and the one or more capabilities; and configuring, by the self-aware light bulb, at least one setting of at least one parameter of the self-aware light bulb to achieve the one or more objectives.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

Conventional smart lights have limited capabilities focused primarily on changing lighting colors based on a user's configuration. Furthermore, this requires extensive manual user configuration using applications (e.g. mobile phone apps, computer program, etc.) that are not intuitive and necessitate a great deal of learning on the part of the user.

There is a need for smart lights that are able to be more easily configured and integrated into a device ecosystem, as well as provide enhanced functionality.

In accordance with various disclosed aspects, a self-aware light that comprises instruments, and is able to communicate with other self-aware lights and other devices is presented. The self-aware light can understand its environment and device ecosystem using the instruments, and perform a self-configuration to optimize its functionality for the environment and device ecosystem. It is to be appreciated that the self-aware light can be a retrofit light bulb with instruments integrated therein. In another embodiment, the self-aware light can have all or a portion of the instruments integrated into a light fixture (e.g. socket, holder, ballast) for the self-aware light. A self-aware light can learn about its context and customize its configuration and/or operation in accordance with the context (e.g. using artificial intelligence). This can eliminate or minimize the need for an operator (e.g. user, administrator, or any other suitable entity) to perform manual configuration. Furthermore, a set of self-aware lights can automatically perform coordinated self-configuration and operation. All examples below can involve coordination amongst a set of self-aware lights to achieve an objective (e.g. goal, intention, purpose, action, operation, configuration, etc.), whether explicitly stated or not. Further, although the term "self-aware light" is used herein, in various embodiments, the examples provided can include one or more self-aware lights operating independently or in a distributed fashion, as applicable. All such embodiments are envisaged.

Figure 1:
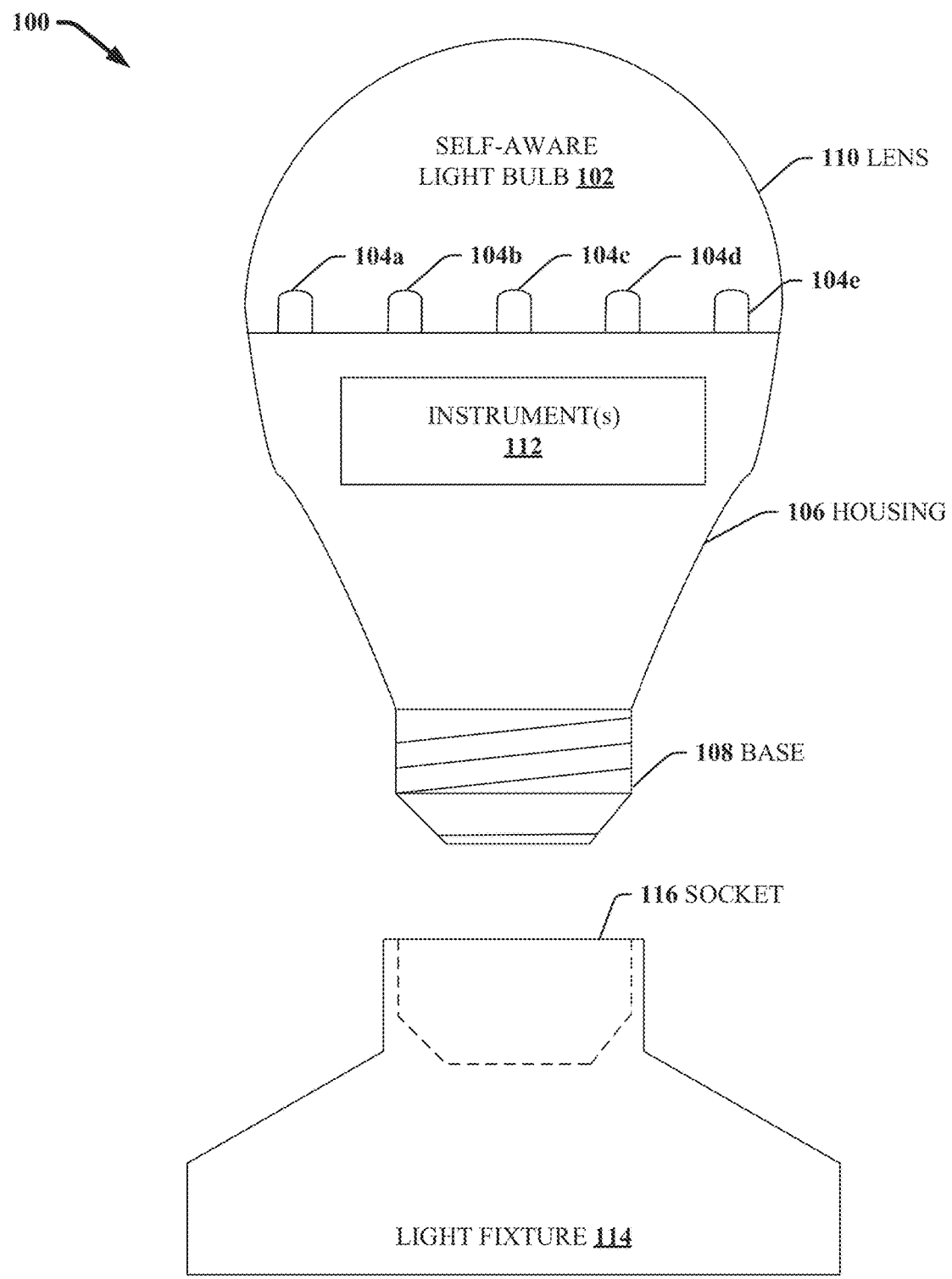
FIG. 1 illustrates a block diagram of an example, non-limiting self-aware light in accordance with one or more embodiments described herein.
Figure 2:
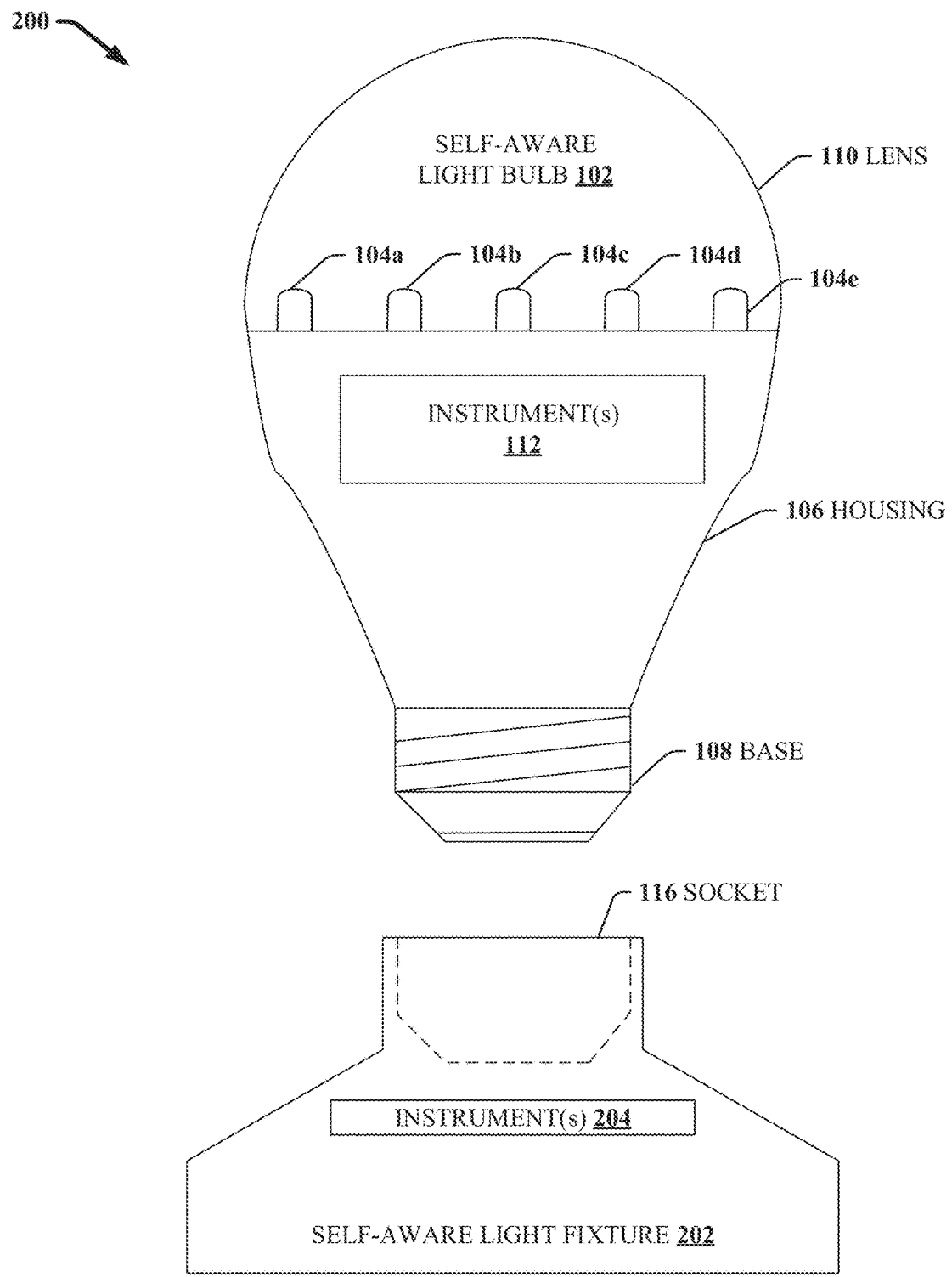
FIG. 2 illustrates a block diagram of an example, non-limiting self-aware light in accordance with one or more embodiments described herein.

FIGS. 1-2 illustrate block diagrams of example, non-limiting self-aware lights 100, 200 in accordance with one or more embodiments described herein. The subject disclosure is directed to computer processing systems, computer-implemented methods, apparatus and/or computer program products that facilitate efficiently, effectively, and automatically (e.g., with little or no direct involvement from an operator) employing self-aware lights 100, 200 that perform self-configuration. For example, when installed, self-aware light 100, 200 can employ sensors, tools, and communication devices to determine its place in the environment and device ecosystem and perform an auto-configuration. In an example, self-aware light 100, 200 can employ sensors to understand the physical environment in which it is installed, and determine how it fits into the physical environment. In another example, self-aware light 100, 200 can communicate on one or more networks to identify other self-aware lights 100, 200 and other devices in the device ecosystem, and determine how it fits into the device ecosystem. Based on the determinations, self-aware light 100, 200 can generate a light profile for itself and can perform an autoconfiguration according to the light profile. It is to be appreciated that a user interface (not shown) can be provided that allows an operator to manually adjust the light profile and/or configuration generated by the self-aware light 100, 200.

In order to facilitate self-configuration, self-aware lights 100, 200 described herein can be employed that are communicating with each other, communicating with another device. The self-aware lights 100, 200 can coordinate amongst themselves to make decisions regarding actions to be taken by the self-aware lights 100, 200. Self-aware lights 100, 200 can receive instructions from another device, such as a control system, regarding actions to be taken by the self-aware lights 100, 200. Self-aware lights 100, 200 can receive instructions from an operator, regarding actions to be taken by the self-aware lights 100, 200. A self-aware light 100, 200 can autonomously make decisions regarding actions to be taken by the self-aware light 100, 200. It is to be appreciated that self-aware lights can employ any of the aforementioned decision-making methods, alone or in combination, regarding actions to be taken by the self-aware lights 100, 200.

FIG. 1 illustrates a block diagram of an example, non-limiting self-aware light 100 in accordance with one or more embodiments described herein. Self-aware light 100 comprises a self-aware light bulb 102 which can be installed as a retrofit into a socket 116 of conventional light fixture 114. Self-aware light bulb 102 comprises one or more light emitting devices 104a, 104b, 104c, 104d, and 104e (e.g. light emitting diode (LED), organic light emitting diode (OLED), filament, quantum dot, incandescent, high-intensity discharge (HID), neon, fluorescent, compact fluorescent (CFL), electroluminescent (EL), laser, or any other suitable light emitting device) a housing 106, a base 108, a lens 110, and one or more instruments 112. It is to be appreciated that while five light emitting devices 104a, 104b, 104c, 104d, and 104e are depicted for illustrative purposes only, self-aware light bulb 102 can include any suitable number of light emitting devices. It is also to be appreciated that self-aware light bulb 102 can include other components (not shown) or exclude one or more components. For example, self-aware light bulb 102 can exclude lens 110. In another example, self-aware light bulb 102 can include one or more reflectors, one or more shades, one or more positioning motors, or any other suitable components needed according to functionality described herein.

FIG. 2 illustrates a block diagram of an example, non-limiting self-aware light 200 in accordance with one or more embodiments described herein. Self-aware light 100 comprises a self-aware light bulb 102 which can be installed into a socket 116 of a self-aware light fixture 202. Self-aware light fixture 202 comprises one or more instruments 204. It is to be appreciated that self-aware light fixture 202 can include other components (not shown) or exclude one or more components. For example, self-aware light fixture 202 can include one or more light emitting devices, one or more reflectors, one or more shades, one or more positioning motors, or any other suitable components needed according to functionality described herein. It is to be appreciated that self-aware light bulb 102 can communicate with self-aware light fixture 202 via wired or wireless communications. For example, base 108 connecting to socket 116 can form a wired communication connection.

While FIGS. 1-2 depict a self-aware light bulb 102 fitting into a light fixture 114, 202, it is to be appreciated that a single light fixture 114, 202 can comprise a plurality of sockets 116 for installation of a plurality of self-aware light bulbs 102.

Figure 3:
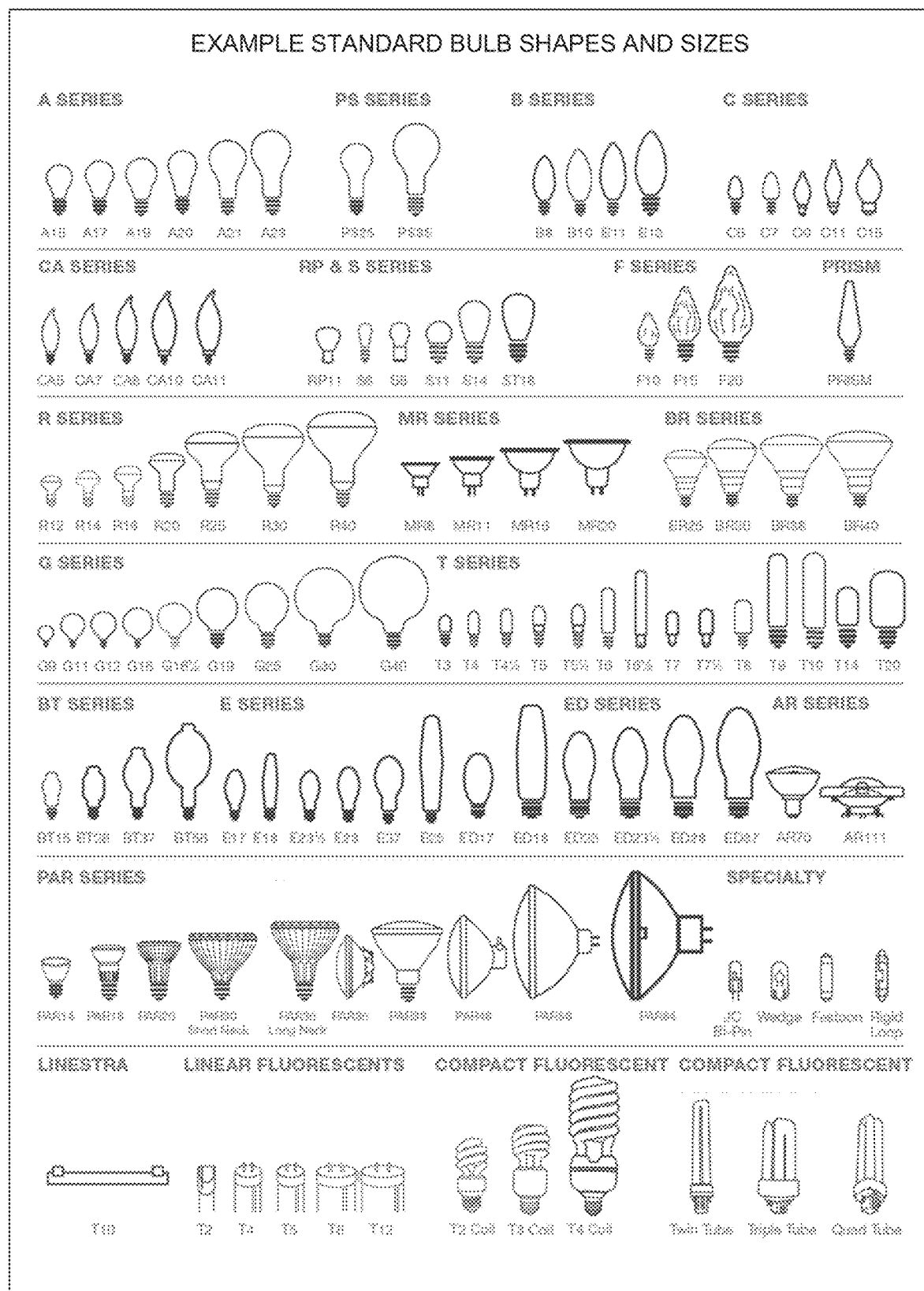
FIG. 3 illustrates example, non-limiting standard bulb shapes and size for self-aware light bulb in accordance with one or more embodiments described herein.

FIG. 3 illustrates example, non-limiting standard bulb shapes and size for self-aware light bulb 102. It is to be appreciated that self-aware light bulb 102 can be customized to be in any suitable shape and any suitable size for an application in which self-aware light bulb 102 is to be installed.

Figure 4:
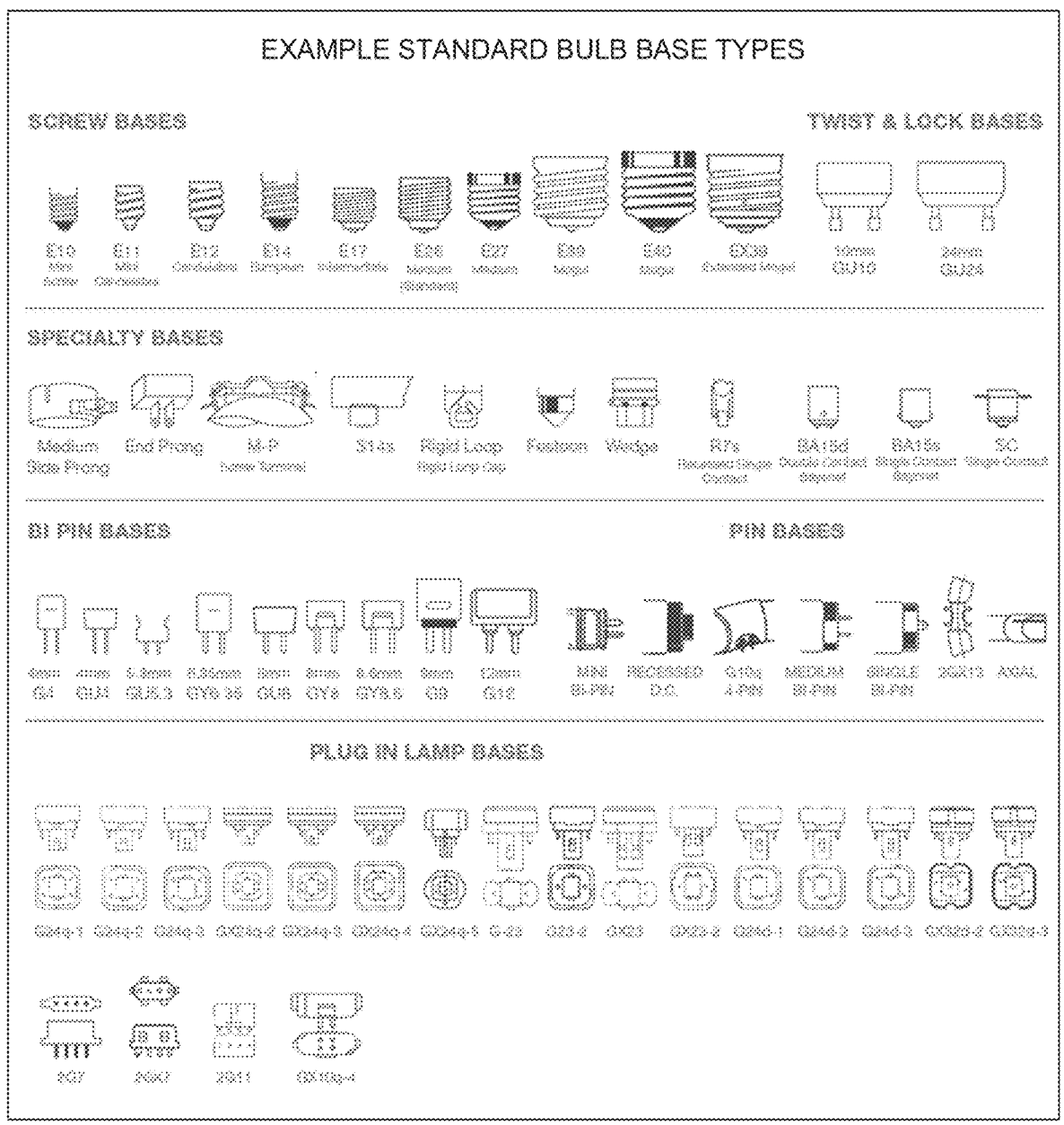
FIG. 4 illustrates example, non-limiting standard base types for base of self-aware light bulb in accordance with one or more embodiments described herein.

FIG. 4 illustrates example, non-limiting standard base types for base 108. It is to be appreciated that base 108 can be customized to be in any suitable form for an application in which self-aware light bulb 102 is to be installed. Likewise, socket 116 can be customized to be compatible with base 108. Additionally, self-aware light fixture 202 can be customized to be in any suitable form for an application in which self-aware light 200 is to be installed.

A self-aware light 100, 200 can include a power source, non-limiting examples of which include electrical grid power, battery, electrochemical cell, fuel cell, natural gas generated electric power, compressed air generated electric power, diesel fuel generated electric power, gasoline generated electric power, oil generated electric power, propane generated electric power, nuclear power system, solar power system, wind power system, piezoelectric power system, micro-electrical mechanical systems (MEMS)-generated electric power, inductive power system, radio-frequency power system, wireless power transfer mechanism, or any other suitable power source. In an example, a self-aware light 100, 200 can have a constantly available power source, such as that provided by an electrical power grid. In another example, a self-aware light 100, 200 can have a temporary power source, such as a battery (e.g. disposable battery or rechargeable battery). In a further example, a self-aware light 100, 200 can generate and store its own power, such as by solar, fuel cell, radio-frequency harvesting, induction, piezoelectric, electro-mechanical, chemical, nuclear, carbon based-fuel, or any other suitable self-generating power source. This is advantageous for long-term installations (e.g. where frequent battery changes would be required) that do not have a constantly available power source, such as an outdoor environment where a power outlet is not available (e.g. a porch, a yard, a camping site, a farm field, a park, a sports field, etc.), or an indoor location where a power outlet is not available (e.g. a closet, a sunroom, a cabinet, a drawer, a garage, a barn, a shed, an indoor location where an extension cord is not desired, etc.). It is to be appreciated that self-aware light 100, 200 can have a plurality of different power sources, with one or more power sources acting as a backup for another power source. It is to be appreciated that self-aware light 100, 200 can have configurable power sources. For example, self-aware light 100, 200 can have a modular configuration that allows for one or more power sources to be added or removed by a manufacturer or operator.

A self-aware light 100, 200 can include one or more computers, one or more processors, one or more memories, and one or more programs. A self-aware light 100, 200 can communicate via any suitable form of wireless or wired communication using a communication device. Non-limiting examples of wireless communication can include radio communication, optical communication, sonic communication, electromagnetic induction communication, or any other suitable wireless communication. A self-aware light 100, 200 can include one or more instruments 112, 204, non-limiting examples of which include a communication device, a radio frequency identification (RFID) reader, a navigation device, a camera, a video camera, a three-dimensional camera, a global positioning system (GPS) device, a motion sensor, a radar device, a temperature sensor, a weather sensor, a humidity sensor, a barometer, a Doppler radar, a light sensor, a thermal imaging device, an infrared camera, an audio sensor, an ultrasound imaging device, a light detection and ranging (LIDAR) sensor, sound navigation and ranging (SONAR) device, a microwave sensor, a chemical sensor, a radiation sensor, an electromagnetic field sensor, a pressure sensor, a spectrum analyzer, a scent sensor, a moisture sensor, a biohazard sensor, a touch sensor, a gyroscope, an altimeter, a microscope, magnetometer, a device capable is seeing through or inside of objects, or any other suitable sensors. In addition, instruments 112, 204 can include tools, non-limiting examples of which include, a projectile launcher, a liquid sprayer, an air blower, a flame thrower, a heat projector, a cold projector, a scent projector, a chemical projector, an electric discharge device, a fire extinguisher, a laser, or any other suitable tools to perform any task. Additionally, instruments 112, 204 can include a display screen, a video projector, an audio speaker, or any other suitable instrument. It is to be appreciated that self-aware light 100, 200 can have configurable instruments. For example, self-aware light 100, 200 can have a modular configuration that allows for one or more instruments to be added or removed by a manufacturer or operator.

A self-aware light 100, 200 can be constructed out of any suitable material appropriate for environments in which the self-aware light 100, 200 will operate. A self-aware light 100, 200 can have suitable protection against an environment in which the self-aware light 100, 200 will operate, non-limiting examples of which include weather resistant, crush resistant, fire resistant, heat resistant, cold resistant, pressure resistant, impact resistant, liquid and/or solid material ingress protection, chemical resistant, corrosion resistant, shatter resistant, scratch resistant, bio-contamination resistant, electromagnetic pulse resistant, electrical shock resistant, projectile resistant, explosion resistant, or any other suitable resistance for an environment in which the self-aware light 100, 200 will operate.

The computer processing systems, computer-implemented methods, apparatus and/or computer program products of self-aware light 100, 200 employ hardware and/or software to solve problems that are highly technical in nature (e.g., related to complex coordination of one or more self-aware lights 100, 200 possibly with other device to perform self-configuration of the one or more self-aware lights 100, 200) that are not abstract and that cannot be performed as a set of mental acts by a human. One or more embodiments of the subject computer processing systems, methods, apparatuses and/or computer program products enable one or more self-aware lights 100, 200 to coordinate amongst themselves, and optionally with other devices, to perform actions to understand the environment in which the one or more self-aware lights 100, 200 is installed, determine an objective of the installation, perform a self-configuration according to the determined objective, and operate to achieve the determined objective. For example, the self-aware lights 100, 200 can employ artificial intelligence to learn their environment, and learn actions to perform to self-configure and operate for a determined objective of the installation in the environment.

Figure 5:
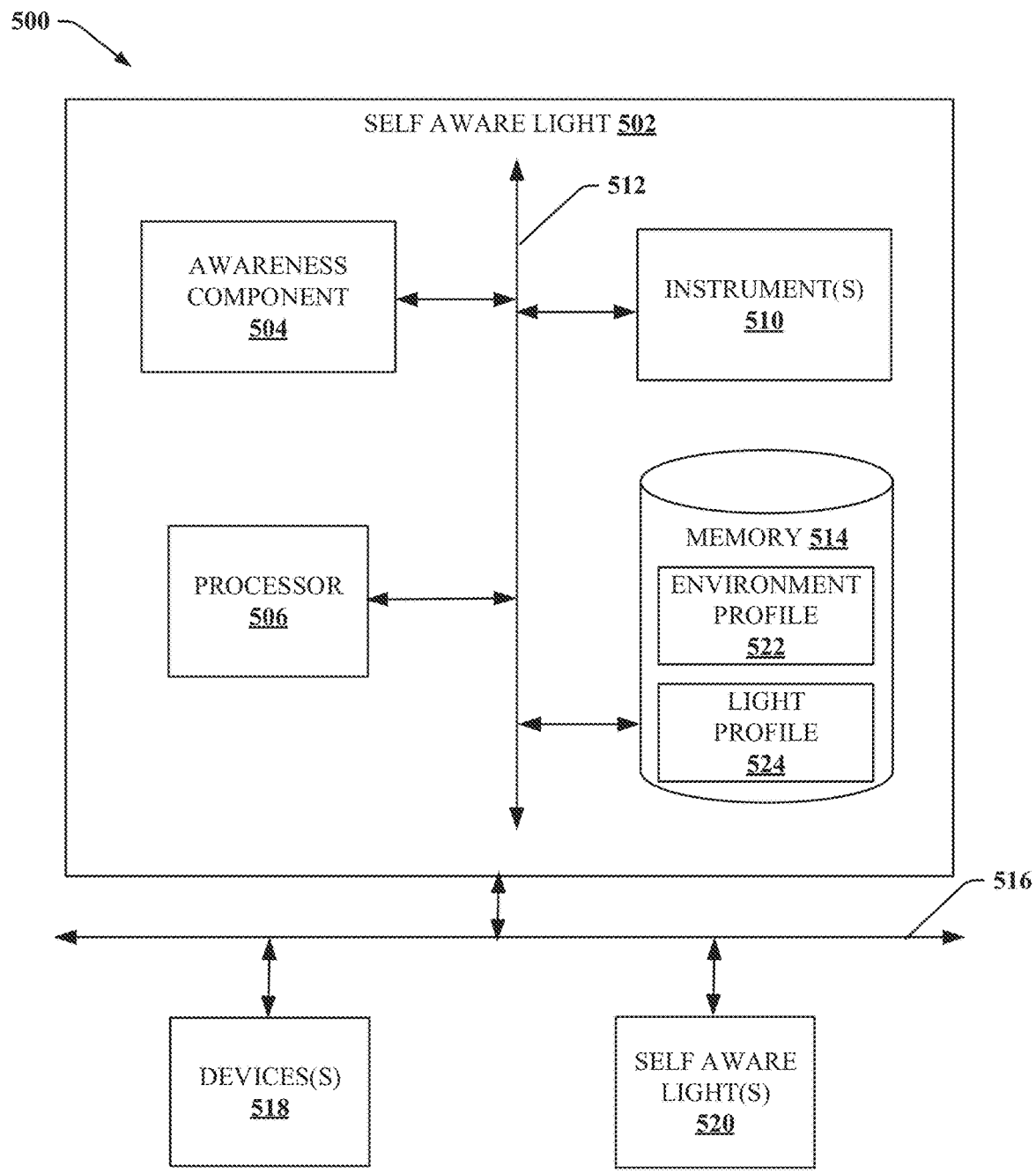
FIG. 5 illustrates a block diagram of an example, non-limiting self-aware light in accordance with one or more embodiments described herein.

FIG. 5 illustrates a block diagram of an example, non-limiting system 500 that facilitates a self-aware light 502 to understand the environment in which the self-aware light 502 is installed, determine an objective of the installation, perform a self-configuration according to the determined objective, and operate to achieve the determined objective in accordance with one or more embodiments described herein. Repetitive description of like elements employed in other embodiments described herein is omitted for sake of brevity.

In some embodiments, the system 500 facilitates a plurality of self-aware lights 502, 520 coordinating together to understand the environment in which the self-aware lights 502, 520 are installed, determine an objective of the installation, perform a self-configuration according to the determined objective, and operate to achieve the determined objective in accordance with one or more embodiments described herein. Aspects of systems (e.g., system 500 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 5, the system 500 can include self-aware lights 502, 520, one or more networks 516, and one or more devices 518. In various embodiments, self-aware lights 502, 520 can be or include the structure and/or functionality of one or more of self-aware lights 100 or 200 and/or any other structure and/or functionality described herein for self-aware lights. In one example, self-aware light 502 can be a different type of self-aware light than self-aware light 520. In another example, a self-aware light 520 can be a self-aware light 502 and/or include one or more components of self-aware light 502. It is to be appreciated that in disclosure herein in which more than one self-aware light is employed, the self-aware lights can include one or more self-aware light 502 and/or one or more self-aware light 520.

Self-aware light 502 can include instruments 510, which can include or be one or more of numerous different types of instruments 112, 204 disclosed herein. Self-aware light 502 can communicate with other self-aware lights 520 and devices 518 over one or more networks 516 via wireless and/or wired communications using instruments 510. Self-aware light 502 can include awareness component 504 that can enable self-aware light 502 to understand the environment in which the self-aware light 502 is installed, determine an objective of the installation, perform a self-configuration according to the determined objective, and operate to achieve the determined objective.

Self-aware light 502 can include or otherwise be associated with at least one memory 514 that can store computer executable components (e.g., computer executable components can include, but are not limited to, the awareness component 504, and/or associated components) and can store any data generated or obtained by self-aware light 502 and associated components. Memory 514 can store an environment profile 522 that describes characteristics of an environment in which self-aware light 502 is installed. Memory 514 can store a light profile 524 that can include environment profile, and capabilities and configuration of self-aware light 502. Self-aware light 502 can also include or otherwise be associated with at least one processor 506 that executes the computer executable components stored in the memory 514. Self-aware light 502 can further include a system bus 512 that can couple the various components including, but not limited to, awareness component 504, instruments 510, memory 514, processor 506, and/or other components.

Device 518 can be any electronic device that can electronically interact (e.g. unidirectional interaction or bidirectional interaction) with self-aware light 502, non-limiting examples of which can include a wearable electronic device or a non-wearable electronic device. It is to be appreciated that interaction can include in a non-limiting example, communication, control, physical interaction, or any other suitable interaction between devices. Wearable device can include, for example, heads-up display glasses, a monocle, eyeglasses, contact lens, sunglasses, a headset, a visor, a cap, a mask, a headband, clothing, or any other suitable device that can be worn by a human or non-human user that comprises electronic components. Non-wearable devices can include, for example, a mobile device, a mobile phone, a camera, a camcorder, a video camera, laptop computer, tablet device, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, a mainframe computer, a robotic device, an artificial intelligence system, a home automation system, a security system, a messaging system, a presentation system, a sound system, a warning system, a fire suppression system, a lighting system, a network storage device, a communication device, a web server device, a network switching device, a network routing device, a gateway device, a network hub device, a network bridge device, a control system, a washing machine, a dryer, a refrigerator, a dishwashing machine, an oven, a stove, a microwave, a coffee maker, a kitchen appliance, a toy, or any other suitable device. Device 518 can be equipped with a communication device that enables device 518 to communicate with self-aware light 502 and/or 520 over network 516. It is to be appreciated that a device 518 can be employed by a operator to interact with a self-aware light 502 and/or 520.

The various components (e.g., awareness component 504, instruments 510, memory 514, processor 506, self-aware lights 502, 520, and/or other components) of system 500 can be connected either directly or via one or more networks 516. Such networks 516 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, or any other suitable communication technology.

Figure 6:
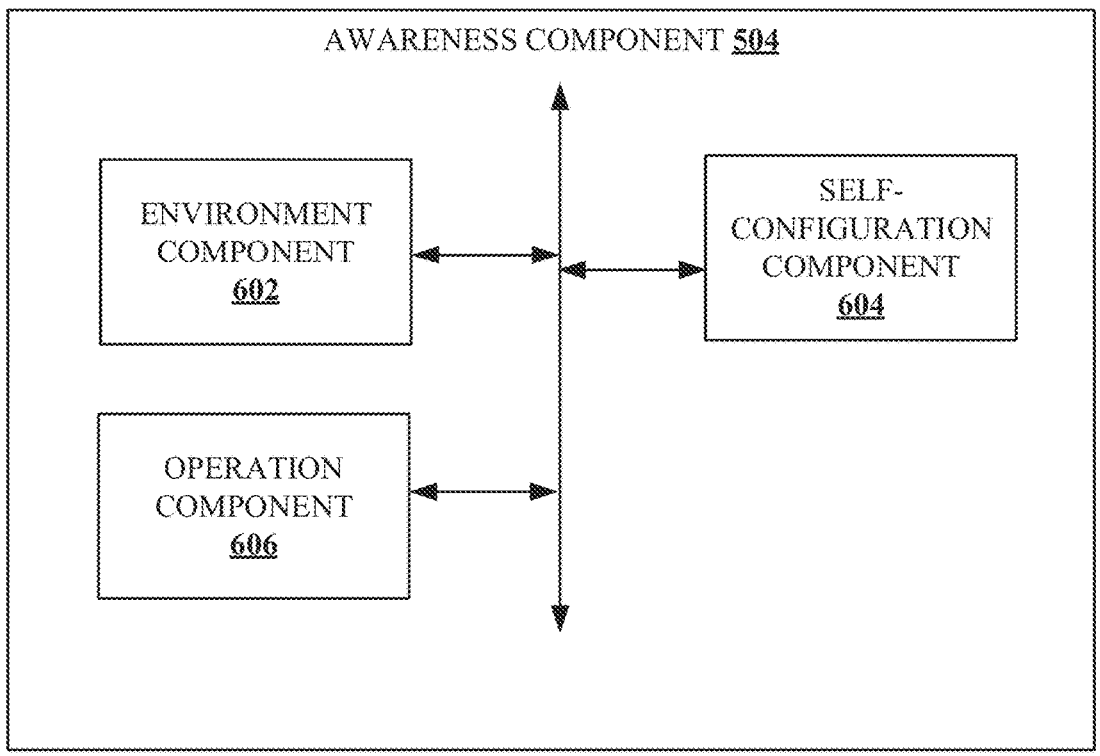
FIG. 6 illustrates a block diagram of an example, non-limiting awareness component in accordance with one or more embodiments described herein.

FIG. 6 illustrates a block diagram of an example, non-limiting awareness component 504 that can facilitate self-aware light 502 to determine (e.g., ascertain, infer, calculate, predict, prognose, estimate, derive, forecast, detect, and/or compute) characteristics of the environment in which the self-aware light 502 is installed, determine capabilities of self-aware light 502, determine one or more objectives of the installation of self-aware light 502, perform a self-configuration of self-aware light 502 according to the determined one or more objectives, and determine and execute suitable actions for self-aware light 502 to perform to achieve the determined one or more objectives in accordance with one or more embodiments described herein. Repetitive description of like elements employed in other embodiments described herein is omitted for sake of brevity.

Awareness component 504 can include environment component 602 that can determine characteristics of an environment in which the self-aware light 502 is installed. Awareness component 504 can also include self-configuration component 604 that can determine capabilities of self-aware light 502, determine one or more objectives of the installation of self-aware light 502, and perform a self-configuration of self-aware light 502 according to the determined one or more objectives. Awareness component 504 can also include operation component 606 that can determine and execute suitable actions for self-aware light 502 to perform to achieve the determined one or more objectives.

Environment component 602 can employ one or more instruments 510 to obtain information about the environment in which the self-aware light 502 is installed and determine characteristics of the environment. In a non-limiting embodiment, characteristics can include objects, devices, people, flora, fauna, predators, pests, colors, scents, biohazards, chemicals, dimensional characteristics, health status, locations, topography, landscape, seascape, boundaries, atmosphere, manmade features, furniture, toys, equipment, machines, vehicles, buildings, grounds, roads, railroad tracks, water feature, rocks, trees, debris, geographic features, unsafe conditions, weather conditions, property line boundary, ground conditions, water conditions, atmospheric conditions, water currents, air currents, water salinity, air temperature, water temperature, ground temperature, ground traction, network topology, or any other suitable characteristics of the environment that can be determined from information obtained by instruments 510.

It is to be appreciated that environment component 602 can employ intelligent recognition techniques (e.g., spatial relationship recognition, pattern recognition, object recognition, facial recognition, animal recognition, pose recognition, action recognition, shape recognition, scene recognition, behavior recognition, sound recognition, scent recognition, voice recognition, audio recognition, image recognition, motion recognition, hue recognition, feature recognition, edge recognition, texture recognition, timing recognition, location recognition, and/or any other suitable recognition technique) to determine characteristics based on information obtained by one or more instruments 510.

Figure 7:
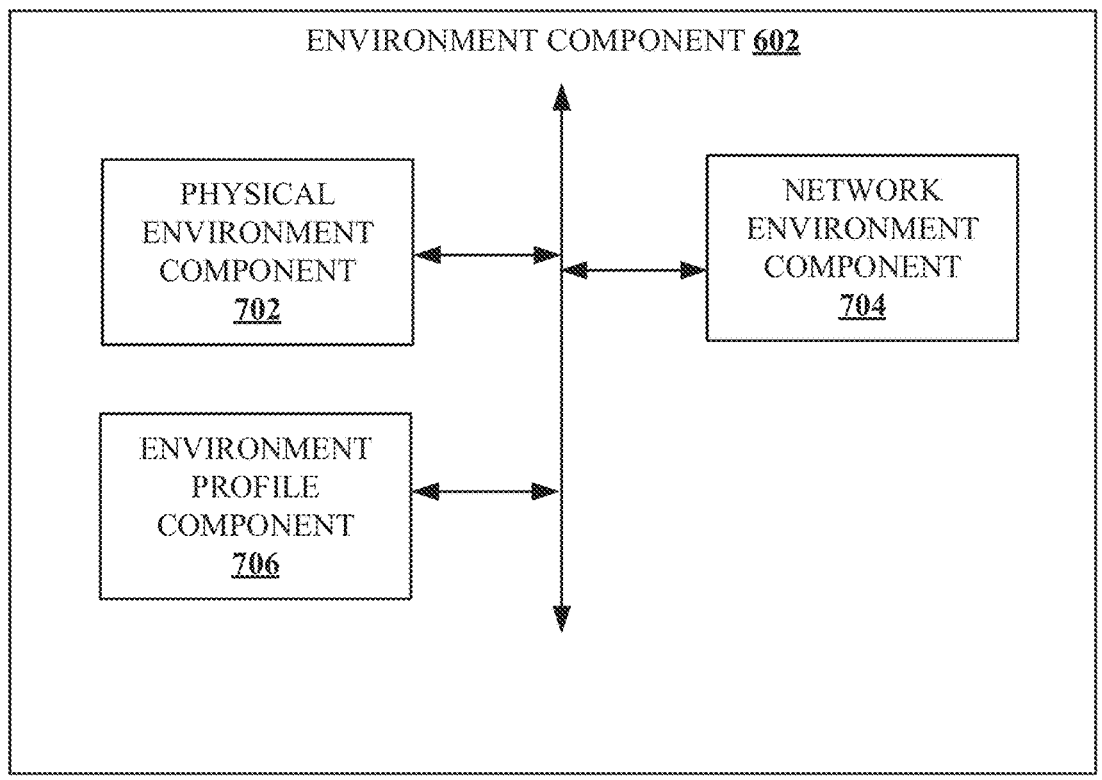
FIG. 7 illustrate a block diagram of an example, non-limiting environment component in accordance with one or more embodiments described herein.

FIG. 7 illustrates a block diagram of an example, non-limiting environment component 602 in accordance with one or more embodiments described herein. Environment component 602 can include physical environment component 702 that can employ one or more sensors as described above to obtain physical information about the physical environment in which self-aware light 502 is installed. In an example, environment component 602 can employ a camera to obtain visual information about the environment. In another example, environment component 602 can employ a microphone to obtain audio information about the environment. In a further example, environment component 602 can employ a GPS device to obtain its location in the environment. In another example, environment component 602 can employ an LIDAR sensor to obtain mapping information about the environment. In an additional example, environment component 602 can employ GPS device and LIDAR sensor to map the locations of characteristics recognized in the environment. It is to be appreciated that physical environment component 702 can employ any suitable instrument to obtain corresponding information produced by the instrument about the physical environment.

Environment component 602 can include network environment component 704 that can employ one or more instruments as described above to obtain information about the network environment in which self-aware light 502 is installed. In an example, network environment component 704 can employ a communication device to discover communication networks operating in the environment. Network environment component 704 can connect to one or more of the networks using suitable security and authentication schemes and obtain device information about devices 518 and/or self-aware lights 520 operating on the networks. In a non-limiting example, device information can comprise device type, device model number, device location, device functionality, device configuration, device security, communication protocols supported, or any other suitable attribute of a device 518. It is to be appreciated that network environment component 704 can employ suitable security techniques to prevent unauthorized access to self-aware light 502 while obtaining device information on other devices 118 on the one or more networks. Self-aware light 502 can determine what security and/or communication protocols it should employ and self-configure for operation using the appropriate security and/or communication protocols.

Environment component 602 can also include environment profile component 706 that can create an environment profile 522 that describes the characteristics of the environment in which self-aware light 502 is installed based on the physical information and the device information obtained by the one or more instruments 510. For example, environment profile component 706 can employ intelligent recognition techniques to recognize characteristics of the environment based on the physical information and the device information. In an additional example, environment profile component 706 can associate device information obtained from devices 518 with corresponding physical information associated with the devices 518 obtained from sensors. Environment profile component 706 can also employ knowledge resources (e.g., internet, libraries, encyclopedias, databases, devices 518, or any other suitable knowledge resources) to obtain detailed information describing the characteristics. For example, environment profile component 706 can obtain detailed product information related to recognized characteristics of the environment. In another example, environment profile component 706 can obtain risk information related to recognized characteristics of the environment. In a further example, environment profile component 706 can obtain information describing interaction between various recognized characteristics of the environment. Environment profile component 706 can obtain any suitable information associated with recognized characteristics of the environment from any suitable knowledge resource.

Furthermore, environment profile component 706 can generate a confidence metric indicative of a confidence of a determination of a characteristic that has been made by environment profile component 706 based on any suitable function. For example, environment profile component 706 can employ the multiple sources of information (e.g., physical information, device information, and information from knowledge sources) and perform a cross-check validation across the various sources to generate a confidence metric indicative of a confidence of an accuracy of a determination of a characteristic.

Environment profile component 706 can employ the characteristics and any associated obtained information to generate an environment profile 522 that describes the characteristics of the environment. The environment profile 522 can be organized in any suitable manner, non-limiting examples of which include an array, a table, a tree, a map, graph, a chart, a list, network topology, or any other suitable manner of organizing data in a profile. In a non-limiting example, environment profile 522 can include respective entries for each characteristic of the environment that comprise a detailed description of the characteristic, a location of the characteristic in the environment, tracking information describing changes to the characteristic over time, source used to determine the characteristic, confidence of accuracy of the determined characteristic, or any other suitable information associated with the characteristic. Environment profile 522 can include a map of the environment identifying characteristics and their locations on the map.

Figure 9:
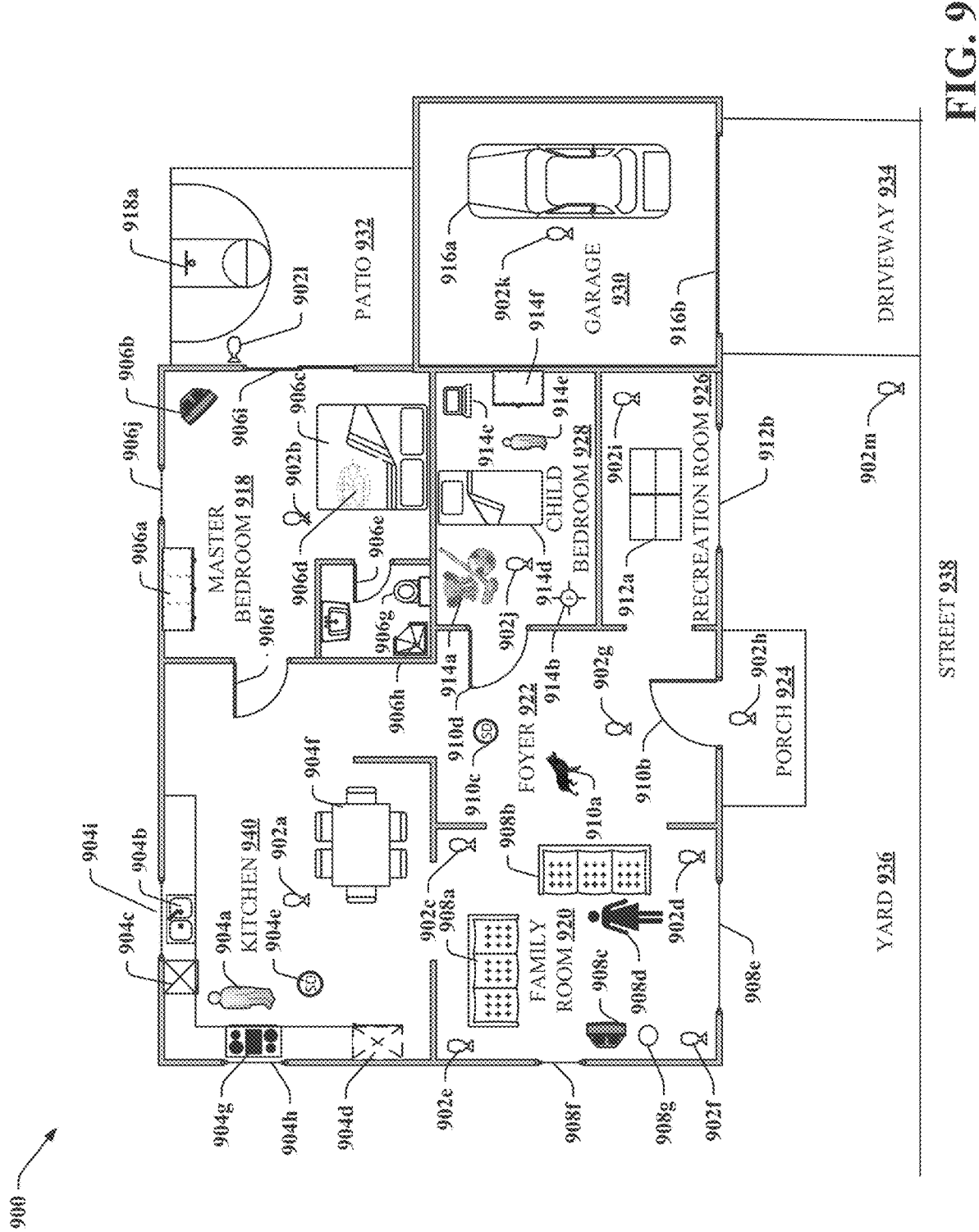
FIG. 9 illustrates a block diagram of an example, non-limiting environment in which self-aware lights are installed in accordance with one or more embodiments described herein.

FIG. 9 illustrates a block diagram of an example, non-limiting environment 900 in which self-aware lights are installed in accordance with one or more embodiments described herein. For exemplary purposes only, environment 900 is depicted as a home. It is to be appreciated that self-aware lights can be installed in any suitable environment, non-limiting examples of which can include indoor, outdoor, underwater, embedded in a material, building, office, hospital, factory, warehouse, school, mall, store, bus terminal, train terminal, airport, vehicle, barn, or any other suitable environment. All such embodiments are envisaged.

Environment 900 has installed self-aware lights 902a, 902b, 902c, 902d, 902e, 902f, 902g, 902h, 902i, 902j, 902k, 902l, and 902m, which can respectively be or include portions of self-aware light 502. While FIG. 9 depicts thirteen self-aware lights for exemplary purposes, it is to be appreciated that any suitable quantity of self-aware lights can be installed in an environment.

Self-aware light 902a can employ instruments 510 to determine characteristics of the environment 900 in which it is installed. For example, self-aware light 902a can employ sensors to obtain physical information and recognize characteristics, such as man 904a, sink 904b, dishwasher 904c, refrigerator 904d, smoke detector 904e, dining table 904f, stove 904g, and windows 904h and 904i, and door 906f. In a further example, self-aware light 902a can determine atmospheric conditions, cleaning chemicals used, lighting conditions at various times of the day, usage of characteristics over time, dimensional information of the characteristics, locations of characteristics, traffic in the environment, changes to characteristics over time, or any other suitable physical information that can be obtained from sensors. Additionally, self-aware light 902a can determine that it is located near the center of a room. In another example, self-aware light 902a can employ communication devices to determine and establish communications on networks (e.g. Wi-Fi, home automation, etc.), such as a network on which devices dishwasher 904c, refrigerator 904d, smoke detector 904e, and stove 904g are communicating and obtain device information from devices dishwasher 904c, refrigerator 904d, smoke detector 904e, and stove 904g. Self-aware light 902a can also communicate with one or more knowledge sources to obtain information about characteristics of the environment. It is to be appreciated that self-aware light 902a can also establish a direct communication link (e.g., not through a network) with a device 118 to obtain device information. Self-aware light 902a can also establish communications with one or more of self-aware lights 902b, 902c, 902d, 902e, 902e, 902f, 902g, 902h, 902i, 902j, 902k, 902l, or 902m and obtain information about environment 900 that those self-aware lights have determined. Self-aware light 902a can determine based on the information (e.g. physical information, device information, and/or information from knowledge sources) that self-aware light 902a is installed in an environment that is kitchen 940. Furthermore, self-aware light 902a can determine that it is part of a larger environment 900 that is a home based on the information. Self-aware light 902a can generate an environment profile 522 for self-aware light 902a based on the determined characteristics and associated obtained information.

Self-aware light 902b can employ instruments 510 to determine characteristics of the environment 900 in which it is installed. For example, self-aware light 902b can employ sensors to obtain physical information and recognize characteristics, such as dresser 906a, television 906b, king size bed 906c, suit 906d, door 906e, door 906f, toilet 906g, shower 906h, and windows 906i and 906j. In a further example, self-aware light 902b can determine scents, allergens, cleaning chemicals used, lighting conditions at various times of the day, usage of characteristics over time, dimensional information of the characteristics, locations of characteristics, traffic in the environment, changes to characteristics over time, or any other suitable physical information that can be obtained from sensors. Additionally, self-aware light 902b can determine that it is located near the center of a room. Self-aware light 902b can also communicate with one or more knowledge sources to obtain information about characteristics of the environment. Self-aware light 902b can also establish communications with one or more of self-aware lights 902a, 902c, 902d, 902e, 902e, 902f, 902g, 902h, 902i, 902j, 902k, 902l, or 902m and obtain information about environment 900 that those self-aware lights have determined. Self-aware light 902b can determine based on the information (e.g. physical information, device information, and/or information from knowledge sources) that self-aware light 902b is installed in an environment that is a master bedroom 918. For example, based on king size bed 906c, suit 906d, toilet 906g, and shower 906, self-aware light 902b can infer that the environment is a bedroom, and is a master bedroom 918 due to the size of the bed, the suit, and an attached bathroom. Furthermore, self-aware light 902b can determine that it is part of a larger environment 900 that is a home based on the information. Self-aware light 902b can generate an environment profile 522 for self-aware light 902b based on the determined characteristics and associated obtained information.

Self-aware lights 902c, 902d, 902e, and 902f can respectively employ instruments 510 to determine characteristics of the environment 900 in which they are installed. For example, self-aware lights 902c, 902d, 902e, and 902f can employ sensors to obtain physical information and recognize characteristics, such as self-aware lights 902c, 902d, 902e, and 902f, sofa 908a, sofa 908b, television 908c, woman 908d, window 908e, window 908f, home automation device 908g, and one or more characteristics from kitchen 940, foyer 922, yard 936, porch 924, and street 938 that can be sensed by instruments 510. In a further example, self-aware lights 902c, 902d, 902e, and 902f can determine activities of woman 908d and others that move in and out of the room, lighting conditions at various times of the day, usage of characteristics over time, dimensional information of the characteristics, locations of characteristics, traffic in the environment, changes to characteristics over time, or any other suitable physical information that can be obtained from sensors. Additionally, self-aware lights 902c, 902d, 902e, and 902f can determine respectively that they are located near the different corners of a room. In another example, self-aware aware lights 902c, 902d, 902e, and 902f can employ communication devices to determine and establish communications on networks (e.g. Wi-Fi, home automation, etc.), such as a network on which devices television 908c and home automation device 908g communicate, and obtain device information from devices television 908c and home automation device 908g. Self-aware lights 902c, 902d, 902e, and 902f can also communicate with one or more knowledge sources to obtain information about characteristics of the environment. Self-aware lights 902c, 902d, 902e, and 902f can also establish communications with one or more of self-aware lights 902a, 902b, 902c, 902d, 902e, 902e, 902f, 902g, 902h, 902i, 902j, 902k, 902l, or 902m, and obtain information about environment 900 that those self-aware lights have determined. Self-aware lights 902c, 902d, 902e, and 902f can determine based on the information (e.g. physical information, device information, and/or information from knowledge sources) that Self-aware lights 902c, 902d, 902e, and 902f are installed in an environment that is a family room 920. Furthermore, self-aware lights 902c, 902d, 902e, and 902f can determine that they are part of a larger environment 900 that is a home based on the information. Self-aware lights 902c, 902d, 902e, and 902f can generate respective environment profiles 522 for self-aware lights 902c, 902d, 902e, and 902f based on the determined characteristics and associated obtained information.

Self-aware light 902g can employ instruments 510 to determine characteristics of the environment 900 in which it is installed. For example, self-aware light 902g can employ sensors to obtain physical information and recognize characteristics, such as dog 910a, door 910b, smoke detector 910c, door 910d, and one or more characteristics from family room 920, porch 924, recreation room 926, yard 936, and street 938 that can be sensed by instruments 510. In a further example, self-aware light 902g can determine dog 910a odors, lighting conditions at various times of the day, usage of characteristics over time, dimensional information of the characteristics, locations of characteristics, traffic through door 910b, changes to characteristics over time, or any other suitable physical information that can be obtained from sensors. Additionally, self-aware light 902g can determine that it is located near off center of a room closer to door 910b. Self-aware light 902b can also communicate with one or more knowledge sources to obtain information about characteristics of the environment. Self-aware light 902g can also establish communications with one or more of self-aware lights 902a, 902b, 902c, 902d, 902e, 902e, 902f, 902h, 902i, 902j, 902k, 902l, or 902m and obtain information about environment 900 that those self-aware lights have determined. Self-aware light 902g can determine based on the information (e.g. physical information, device information, and/or information from knowledge sources) that self-aware light 902g is installed in an environment that is a foyer 922. Furthermore, self-aware light 902g can determine that it is part of a larger environment 900 that is a home based on the information. Self-aware light 902g can generate an environment profile 522 for self-aware light 902g based on the determined characteristics and associated obtained information.

Self-aware light 902h can employ instruments 510 to determine characteristics of the environment 900 in which it is installed. For example, self-aware light 902h can employ sensors to obtain physical information and recognize characteristics, such as door 910b, window 908e, window 912b, self-aware light 902m, and one or more characteristics from foyer 922, driveway 934, yard 936, and street 938 that can be sensed by instruments 510. In a further example, self-aware light 902h can determine atmospheric conditions at various times of the day, lighting conditions at various times of the day, usage of characteristics over time, dimensional information of the characteristics, locations of characteristics, traffic through door 910b, changes to characteristics over time, or any other suitable physical information that can be obtained from sensors. Additionally, self-aware light 902h can determine that it is located in an area that is outdoors and is near to door 910b. Self-aware light 902h can also communicate with one or more knowledge sources to obtain information about characteristics of the environment. Self-aware light 902g can also establish communications with one or more of self-aware lights 902a, 902b, 902c, 902d, 902e, 902e, 902f, 902g, 902i, 902j, 902k, 902l, or 902m and obtain information about environment 900 that those self-aware lights have determined. Self-aware light 902h can determine based on the information (e.g. physical information, device information, and/or information from knowledge sources) that self-aware light 902h is installed in an environment that is a porch 924. Furthermore, self-aware light 902h can determine that it is part of a larger environment 900 that is a home based on the information. Self-aware light 902h can generate an environment profile 522 for self-aware light 902h based on the determined characteristics and associated obtained information.

Self-aware light 902i can employ instruments 510 to determine characteristics of the environment 900 in which it is installed. For example, self-aware light 902i can employ sensors to obtain physical information and recognize characteristics, such as ping pong table 912a, window 912b, and one or more characteristics from foyer 922 that can be sensed by instruments 510. In a further example, self-aware light 902i can determine activities using the ping pong table 912a, lighting conditions at various times of the day, usage of characteristics over time, dimensional information of the characteristics, locations of characteristics, traffic through door 910b, changes to characteristics over time, or any other suitable physical information that can be obtained from sensors. Additionally, self-aware light 902i can determine that it is located in a corner of a room away from window 912b. Self-aware light 902i can also communicate with one or more knowledge sources to obtain information about characteristics of the environment. Self-aware light 902g can also establish communications with one or more of self-aware lights 902a, 902b, 902c, 902d, 902e, 902e, 902f, 902g, 902h, 902j, 902k, 902l, or 902m and obtain information about environment 900 that those self-aware lights have determined. Self-aware light 902i can determine based on the information (e.g. physical information, device information, and/or information from knowledge sources) that self-aware light 902i is installed in an environment that is a recreation room 926. Furthermore, self-aware light 902i can determine that it is part of a larger environment 900 that is a home based on the information. Self-aware light 902i can generate an environment profile 522 for self-aware light 902i based on the determined characteristics and associated obtained information.

Self-aware light 902j can employ instruments 510 to determine characteristics of the environment 900 in which it is installed. For example, self-aware light 902j can employ sensors to obtain physical information and recognize characteristics, such as toy(s) 914a, door 910d, fan 914b, computer 914c, twin size bed 914d, drawer 914f, and one or more characteristics from foyer 922 that can be sensed by instruments 510. In a further example, self-aware light 902j can determine activities of child 914e using toy(s) 914a, that the room has no windows, lighting conditions at various times of the day, usage of characteristics over time, dimensional information of the characteristics, locations of characteristics, changes to characteristics over time, or any other suitable physical information that can be obtained from sensors. Additionally, self-aware light 902j can determine that it is located in near door 910d of the room. In another example, self-aware light 902j can employ communication devices to determine and establish communications on networks (e.g. Wi-Fi, home automation, etc.), such as a network on which computer 914c communicates, and obtain device information from computer 914c. Self-aware light 902j can also communicate with one or more knowledge sources to obtain information about characteristics of the environment. Self-aware light 902g can also establish communications with one or more of self-aware lights 902a, 902b, 902c, 902d, 902e, 902e, 902f, 902g, 902h, 902i, 902k, 902l, or 902m and obtain information about environment 900 that those self-aware lights have determined. Self-aware light 902j can determine based on the information (e.g. physical information, device information, and/or information from knowledge sources) that self-aware light 902j is installed in an environment that is a child bedroom 928. For example, based on child 914e, twin size bed 914d, and toy(s) 914a, self-aware light 902j can infer that the environment is a bedroom, and is a child bedroom 928 due to the size of the bed, the toys, now windows, and no attached bathroom. Furthermore, self-aware light 902i can determine that it is part of a larger environment 900 that is a home based on the information. Self-aware light 902j can generate an environment profile 522 for self-aware light 902j based on the determined characteristics and associated obtained information.

Self-aware light 902k can employ instruments 510 to determine characteristics of the environment 900 in which it is installed. For example, self-aware light 902k can employ sensors to obtain physical information and recognize characteristics, such as car 916a and garage door 916b, and one or more characteristics from driveway 934, yard 936, and street 938 that can be sensed by instruments 510. In a further example, self-aware light 902k can determine usage patterns of car 916a, usage patterns of garage door 916b, that the room has no windows, lighting conditions at various times of the day, usage of characteristics over time, dimensional information of the characteristics, locations of characteristics, changes to characteristics over time, or any other suitable physical information that can be obtained from sensors. Additionally, self-aware light 902k can determine that it is located near the center of the room. In another example, self-aware light 902k can employ communication devices to determine and establish communications on networks (e.g. Wi-Fi, home automation, etc.), such as a network on which car 916a communicates, and obtain device information from car 916a. Self-aware light 902k can also communicate with one or more knowledge sources to obtain information about characteristics of the environment. Self-aware light 902g can also establish communications with one or more of self-aware lights 902a, 902b, 902c, 902d, 902e, 902e, 902f, 902g, 902h, 902i, 902j, 902l, or 902m and obtain information about environment 900 that those self-aware lights have determined. Self-aware light 902j can determine based on the information (e.g. physical information, device information, and/or information from knowledge sources) that self-aware light 902j is installed in an environment that is a child bedroom 928. Furthermore, self-aware light 902i can determine that it is part of a larger environment 900 that is a home based on the information. Self-aware light 902j can generate an environment profile 522 for self-aware light 902j based on the determined characteristics and associated obtained information.

Self-aware light 902l can employ instruments 510 to determine characteristics of the environment 900 in which it is installed. For example, self-aware light 902l can employ sensors to obtain physical information and recognize characteristics, such as basketball hoop 918a, basketball court lines on the ground, and one or more characteristics from master bedroom 918 that can be sensed by instruments 510. In a further example, self-aware light 902l can determine usage patterns of basketball hoop 918a, activities occurring at various times of day, atmospheric conditions at various times of the day, lighting conditions at various times of the day, usage of characteristics over time, dimensional information of the characteristics, locations of characteristics, changes to characteristics over time, or any other suitable physical information that can be obtained from sensors. Additionally, self-aware light 902l can determine that it is located outside, on an outside wall, near master bedroom 918. Self-aware light 902l can also communicate with one or more knowledge sources to obtain information about characteristics of the environment. Self-aware light 902g can also establish communications with one or more of self-aware lights 902a, 902b, 902c, 902d, 902e, 902e, 902f, 902g, 902h, 902i, 902k, 902j, or 902m and obtain information about environment 900 that those self-aware lights have determined. Self-aware light 902l can determine based on the information (e.g. physical information, device information, and/or information from knowledge sources) that self-aware light 902l is installed in an environment that is a patio 932. Furthermore, self-aware light 902l can determine that it is part of a larger environment 900 that is a home based on the information. Self-aware light 902l can generate an environment profile 522 for self-aware light 902l based on the determined characteristics and associated obtained information.

Self-aware light 902m can employ instruments 510 to determine characteristics of the environment 900 in which it is installed. For example, self-aware light 902m can employ sensors to obtain physical information and recognize characteristics, such as door 910b, window 908e, window 912b, self-aware light 902h, driveway 934, yard 936, garage door 916b, and one or more characteristics from foyer 922, family room 920, recreations room 926, garage 930, and street 938 that can be sensed by instruments 510. In a further example, self-aware light 902m can determine atmospheric conditions at various times of the day, lighting conditions at various times of the day, traffic patterns on street 938, usage of characteristics over time, dimensional information of the characteristics, locations of characteristics, traffic through door 910b, usage patterns of garage door 916b, flora growth patterns in yard 936, fauna patterns in yard 936, pest patterns in yard 936, changes to characteristics over time, or any other suitable physical information that can be obtained from sensors. Additionally, self-aware light 902m can determine that it is located in area that is outdoors and is near to street 938 and driveway 934. Self-aware light 902m can also communicate with one or more knowledge sources to obtain information about characteristics of the environment. Self-aware light 902m can also establish communications with one or more of self-aware lights 902a, 902b, 902c, 902d, 902e, 902e, 902f, 902g, 902i, 902j, 902k, or 902l and obtain information about environment 900 that those self-aware lights have determined. Self-aware light 902m can determine based on the information (e.g. physical information, device information, and/or information from knowledge sources) that self-aware light 902m is installed in an environment that is a yard 936. Furthermore, self-aware light 902m can determine that it is part of a larger environment 900 that is a home based on the information. Self-aware light 902m can generate an environment profile 522 for self-aware light 902m based on the determined characteristics and associated obtained information.

Figure 8:
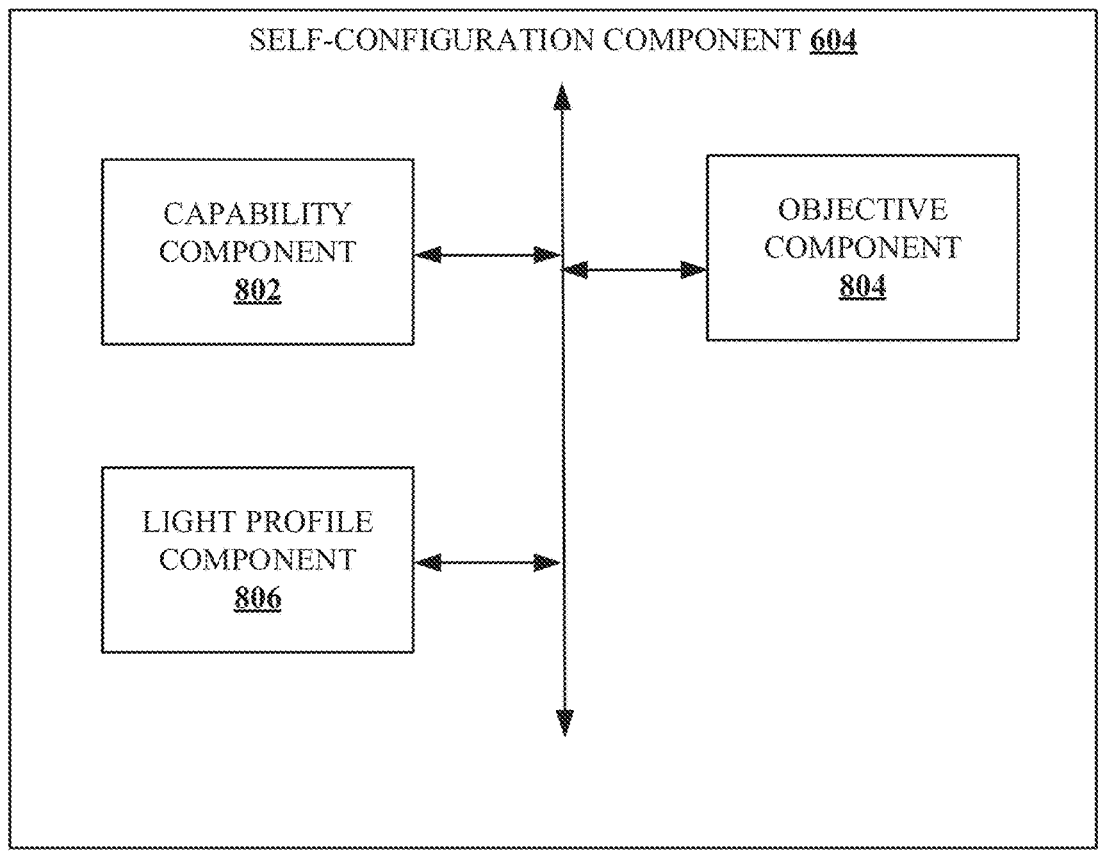
FIG. 8 illustrates a block diagram of an example, non-limiting self-configuration component in accordance with one or more embodiments described herein.

FIG. 8 illustrates a block diagram of an example, non-limiting self-configuration component 604 in accordance with one or more embodiments described herein. Self-configuration component 604 can determine capabilities of self-aware light 502, determine one or more objectives of the installation of self-aware light 502, and perform a self-configuration of self-aware light 502 according to the determined one or more objectives.

Self-configuration component 604 can include capability component 802 that can perform a self-examination to determine capabilities of self-aware light 502. For example, capability component 802 can determine capabilities, such as in a non-limiting example, power sources, computers, processors 506, memories 514, programs, instruments 112, 204, or any other suitable capability of self-aware light 502. In an example, capability component 802 can probe system bus 512 to determine capabilities of self-aware light 502. In another example, capability component 802 can examine memory 514 for information on capabilities of self-aware light 502. In a further example, capability component 802 can obtain information on capabilities of self-aware light 502 from one or more knowledge sources. It is to be appreciated that capability component 802 can employ any suitable mechanism to determine capabilities of self-aware light 502.

Self-configuration component 604 can include objective component 804 that can determine one or more objectives of the installation of self-aware light 502. For example, objective component 804 can employ artificial intelligence to determine an objective of the installation of self-aware light 502 based on environment profile 522 and determined capabilities of self-aware light 502. In a non-limiting example, an objective can be related to safety, automation, control, communication, instruction, entertainment, social enhancement, economics, mood enhancement, activity enhancement, notification, coordination, monitoring, intervention, time management, workflow management, or any other suitable objective. In an example, objective component 804 can select objectives from a library of objectives stored in memory 514 or in one or more knowledge sources. In another example, objective component 804 can create objectives based on artificial intelligence. In a further example, objective component 804 can create linked objectives, wherein one or more objectives depends on one or more other objectives. For example, an objective can become active if another objective is achieved. In another example, an objective can become inactive if another objective is achieved. It is to be appreciated that objective component 804 can employ any suitable mechanism to determine objectives of self-aware light 502.

Self-configuration component 604 can include light profile component 806 that can generate a light profile 524 for self-aware light 502 according to the determined one or more objectives. Light profile 524 can comprise environment profile 522 for self-aware light 502, capabilities of self-aware light 502, and objectives of self-aware light 502. Light profile 524 can be organized in any suitable manner, non-limiting examples of which include an array, a table, a tree, a map, graph, a chart, a list, topology, or any other suitable manner of organizing data in a profile. In a non-limiting example, light profile 524 can include respective entries for each objective that comprise a detailed description of the objective, success metrics for the objective, tracking information describing changes to the objective over time, source used to determine the objective, confidence of accuracy of the determined objective, or any other suitable information associated with the objective. Furthermore, light profile component 806 can configure settings of one or more parameters of self-aware light 502 (e.g., of processors, memory, programs, instruments 510, self-aware light bulb 102, self-aware light fixture 202, housing 106, lens 110, light emitting devices, base 108, socket 116, or any other suitable parameters of components of self-aware lights 502) to achieve the one or more objectives, and store the settings in light profile 524.

Referring back to FIG. 6, awareness component 504 can include operation component 606 that can determine and execute suitable actions for self-aware light 502 to perform to achieve the determined one or more objectives. For example, operation component 606 can employ artificial intelligence to monitor the environment for conditions of the characteristics according to the determined one or more objectives using instruments 510, determine one or more suitable actions for self-aware light 502 to perform to achieve the determined one or more objectives based on the conditions of the characteristics and the determined capabilities, and execute the one or more suitable actions. In an example, operation component 606 can select actions from a library of actions stored in memory 514 or in one or more knowledge sources. In another example, operation component 606 can create actions to perform based on artificial intelligence.

In another example, an operator can employ a user interface (not shown) of an application on a device 518 to enter information overriding data in environment profile 522, light profile 524, and/or actions determined by self-aware light 502.

Referring again to FIG. 9, self-aware light 902a can determine objectives, for example, related to a kitchen. For example, self-aware light 902a can determine an objective such as a cooking assistant (e.g. recipe lookup, cooking timer, ordering groceries, cooking instructions, or any other suitable cooking objective). Self-aware light 902a can employ instruments 510 to monitor what man 904a is cooking and provide suggestions on how to cook a meal, ingredients to add, drinks that go with the meal, side dishes for the meal, or any other suitable cooking suggestions. In an additional example, self-aware light 902a can control stove 904g to cook a meal. In another example, determine an objective such as biohazard detection. For example, self-aware light 902a can employ instruments 510 to monitor food preparation surfaces for contaminants and provide a warning to man 904a of the contaminants. In another example, self-aware light 902a can determine an objective such as meal ready notification. For example, self-aware light 902a can employ instruments 510 to monitor a meal that is cooking and provide a notification to man 904a of when a next step in the cooking process needs to be performed. In a further example, self-aware light 902a can employ instruments 510 to monitor a dining table 904 and determine that a meal is setup on the table, and instruct self-aware lights 902d and 902j to inform woman 908d and child 914e that the meal is ready. In a further example, self-aware light 902a can determine an objective such as hazard detection. For example, self-aware light 902a can determine a hazardous chemical in air in kitchen 940 and use a tool to mitigate the chemical in the air, such as a filter, a chemical neutralizing material sprayer, or any other suitable tool. In another example, self-aware light 902a can recognize a gas leak in kitchen 940 and control any devices with ignition sources in the environment to prevent them from turning on to avert a fire from starting.

Self-aware light 902b can determine objectives, for example, related to a master bedroom. For example, self-aware light 902b can determine an objective such as a sleep enhancement. Self-aware light 902a can employ instruments 510 to monitor a person in king-size bed 906c and adjust lighting, play music, or control television 906b to help the person get to sleep. In another example, self-aware light 902a adjust lighting, play music, or control television 906b to help the person wake up. In a further example, self-aware light 902b can determine an objective such as a television automation. Television 906b can be an older model television that is not smart. Self-aware light 902b can act as voice activated remote control for television 906b using a microphone and infrared transmitter, such that a person in master bedroom 918 can control television 906b with their voice.

A plurality of self-aware lights 502 can determine common objectives, for example. Home speakers are generally not very attractive and are difficult to place in inconspicuous places, usually taking up valuable floor, table/counter, or wall space. Self-aware light 502 can overcome these issues. Self-aware light 502 can have one or more speakers that can produce high fidelity audio output for media content (e.g. music, radio, television shows, movies, videos, speeches, etc.). Self-aware light 502 can also include one or more cameras and microphones. A set of self-aware lights 502 can operate in a coordinated manner to provide stereo and/or surround sound. One or more self-aware lights 502 can also project lights in a pattern, for example that is dynamically adjusted based on the sound being output from the speaker lights. For example, at a party, a festive light pattern can be projected in coordination with music being played. In another example, at a wedding, lights can be played in a dimmed manner with one or more self-aware lights 502 projected more brightly on a bride as she walks down the aisle with the bridal march music playing, and when the bride reaches the alter, the music can be changed or turned off, then when the self-aware light 502 detects that the priest has announced that they are married, festive light patterns and music can be played. In another example, self-aware light 502 can establish a wireless connection with a phone or music player and receive and play audio content, with or without accompanying light display. In a further example, the audio content can have an embedded control stream that instructs the self-aware light 502 to project a defined dynamic light pattern that is pre-coordinated with the audio content.

For example, self-aware lights 902c, 902d, 902e, and 902f can be recessed lights and determine that their locations are advantageous for providing audio for television 908c. Thus, self-aware lights 902c, 902d, 902e, and 902f can determine an objective home theater sound, and communicate with television 908c (being a smart television) to provide home theater sound in conjunction with content playing on television 908c. In another example, where television 908c is not a television and cannot communicate with self-aware lights 902c, 902d, 902e, and 902f, self-aware lights 902c, 902d, 902e, and 902f can determine content playing on television 908c and provide home theater sound associated with the content and synchronized with playback of the content on television 908c. In another example, self-aware lights 902c, 902d, 902e, and 902f can recognize an activity of woman 908d and determine and objective according to the determined activity. For example, woman 908d can be practicing yoga, and self-aware lights 902c, 902d, 902e, and 902f can play yoga music and/or adjust lighting down while woman 908d is practicing yoga. In a further example, self-aware lights 902c, 902d, 902e, and 902f can determine a lighting objective. For example, based on their respective locations and proximity to windows, self-aware lights 902c, 902d, 902e, and 902f can adjust their respective lighting output to achieve a lighting objective, such as even lighting through the room, more natural lighting, appropriate lighting for an activity, or any other suitable lighting objective. Self-aware light 902d can determine it is near window 908e, and output a level of light according to the light coming through the window 908e, such as lower light output when it is sunny outside, and higher light output when it is dark outside.

In another example, self-aware lights 902c, 902d, 902e, and 902f can recognize home automation device 908g and integrate themselves into home automation programs of home automation device 908g related to family room 920. Furthermore, self-aware lights 902c, 902d, 902e, and 902f can form a mesh network with one or more of self-aware lights 902a, 902b, 902g, 902h, 902i, 902j, 902k, 902l, or 902m to integrate self-aware lights 902a, 902b, 902g, 902h, 902i, 902j, 902k, 902l, or 902m into respective home automation programs of home automation device 908g related to kitchen 940, master bedroom 918, foyer 922, porch 924, child bedroom 928, recreation room 926, garage 930, patio 932, driveway 934, yard 936, or environment (e.g. home) 900. It is to be appreciated that one or more of self-aware lights 902a, 902b, 902c, 902d, 902e, 902f, 902g, 902i, 902j, 902k, 902l, or 902m can interface with home automation device 908g directly or through a network to integrate into any suitable home automation programs of home automation device 908g. One or more of self-aware lights 902a, 902b, 902c, 902d, 902e, 902f, 902g, 902h, 902i, 902j, 902k, 902l, or 902m can control home automation device 908g and/or devices 518. In another example, home automation device 908g and/or devices 518 can control one or more of self-aware lights 902a, 902b, 902c, 902d, 902e, 902f, 902g, 902h, 902i, 902j, 902k, 902l, or 902m.

In a further example, self-aware lights 902c and 902g can recognize smoke detectors 904e and 910c and relay warnings from smoke detectors 904e and 910c to self-aware lights 902a, 902b, 902c, 902d, 902e, 902f, 902i, 902j, 902k, 902l, and 902m to provide corresponding warnings in their respective rooms. In another example, self-aware lights 902c and 902g can recognize warnings from smoke detectors 904e and 910c and operate a tool, such as a fire extinguisher to extinguish a fire. In an additional example, self-aware lights 902a, 902b, 902c, 902d, 902e, 902f, 902i, 902j, 902k, 902l, and 902m can recognize that there are no smoke detectors in their respective rooms and determine an objective of smoke detection for themselves. Likewise, self-aware lights 902a, 902b, 902c, 902d, 902e, 902f, 902g, 902h, 902i, 902j, 902k, 902l, or 902m can determine an objective to detect other unsafe conditions (e.g., fire, hazardous chemicals, biohazards, hazardous gases, intruders, pests, rodents, hazardous activities, or any other suitable unsafe conditions), and determine and execute suitable actions to mitigate or provide warnings of the unsafe conditions.

Self-aware light 902g can determine an objective of odor management based on dog 910a and employ a tool such as an air filter or a scent sprayer to manage an order in foyer 922. Self-aware lights 902g can determine an objective of security, monitor door 910b for intruders, and implement an alarm in response to an intruder.

Self-aware light 902h can implement an objective such as video doorbell function, that causes a doorbell sound to emanate from one or more of self-aware lights 902a, 902b, 902c, 902d, 902e, 902f, 902g, 902i, 902j, 902k, 902l, or 902m, upon self-aware light 902h detecting someone approaching door 910b using instruments 510. Furthermore, self-aware light 902h can activate capture an image (e.g.

picture or video) of the person at the door and cause the image to be displayed on one or more devices 518. For example, television 908c can display the image to woman 908d, or self-aware light 902a can project the image on a wall in kitchen 940.

Self-aware light 902j can determine an objective such as child protection. For example, self-aware light 902j can monitor child 914e in child bedroom 928 and provide a warning to man 904a and/or woman 908d when a hazardous condition arises with child 914e. In another example, self-aware light 902j can monitor computer 914c for inappropriate content and block such content on computer 914c, or for usage of computer 914c outside of permitted time window(s) and block operation of computer 914c outside of the permitted time window(s).

Self-aware light 902k can determine an objective, such as garage door control. For example, self-aware light 902k can monitor car 916a, and when car 916a is turned on, self-aware light 902k can cause garage door 916b to open.

Self-aware light 902m can determine an objective, such as traffic safety. For example, self-aware light 902k can monitor driveway 934 for car 916a backing out of garage 930 and provide a warning (e.g. visible, audio, messaging, etc.) to a driver of car 916a if child 914e is in driveway 934. In another example, self-aware light 902k can monitor street 938 and provide a warning to a driver of car 916a when it is not safe for car 916a to enter street 938. In a further example, self-aware light 902m can determine an objective of street lamp based on its proximity to street 938 and driveway 934, and operate in a manner to enhance visibility to driveway 934 and street 938. For example, while indoor lights will likely be off at night, self-aware light 902m will be on at night and during times of low visibility, such as adverse weather conditions, smoke, or any other suitable low visibility condition. In an additional example, self-aware light 902m can determine an objective of weather assistant, and determine and inform occupants of the home of weather conditions outside the home.

Referring back to FIG. 5, self-aware light 502 can enhance (e.g. upgrade, augment, improve, increase, etc.) operation of an older device. There are many older devices that operate reliably for a long period of time. However, given their lengthy operational lifecycles, they fall behind in operational capabilities as compared to newer devices. Many of these older devices have lights installed in them. Self-aware light 502 can be installed in an older device as a retrofit to enhance the capability of the older device. An older device can include any device, that has a light which can be replaced with self-aware light 502. Furthermore, an older device can include any device, that does not have a light, on which self-aware light 502 can be fitted. Non-limiting examples of older devices can include a refrigerator, a freezer, a dryer, a washing machine, a vehicle, machine, a flashlight, a range hood, an oven, a microwave, or any other suitable older device.

Figure 10:
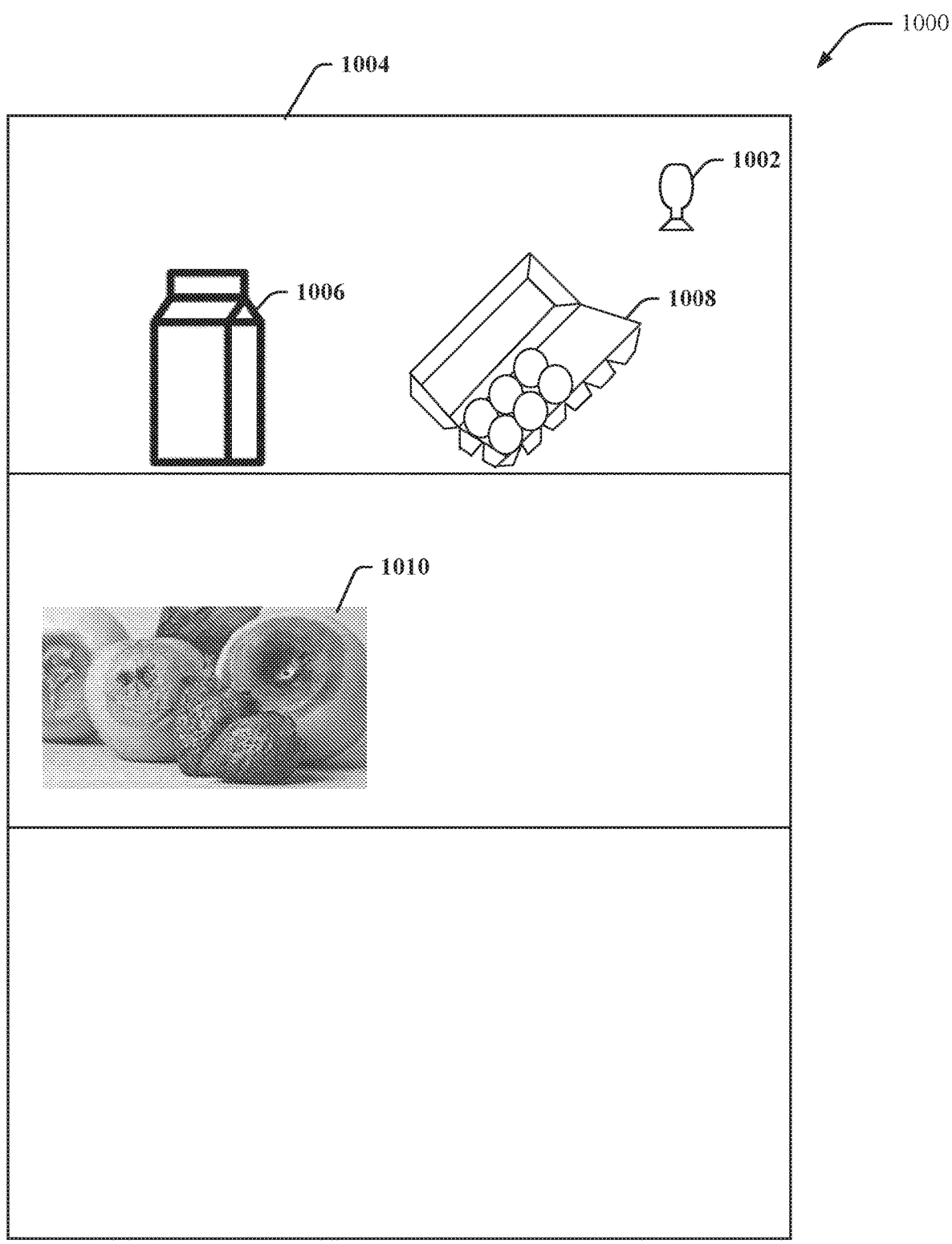
FIG. 10 illustrates a block diagram of an example, non-limiting environment in which self-aware lights are installed in accordance with one or more embodiments described herein.

FIG. 10 illustrates a block diagram of an example, non-limiting environment 1000 which includes a refrigerator 1004 in which self-aware light 1002 is installed in accordance with one or more embodiments described herein. Self-aware light 1002 can be or include portions of self-aware light 502. For example, self-aware light 502 can be self-aware light bulb 102 installed as a retrofit into a light fixture 114 in refrigerator 1004. In another example, self-aware light 502 can be self-aware light 200 where self-aware light fixture 202 replaces a light fixture 114 in refrigerator 1004 and has self-aware light bulb 102 installed. Refrigerator 1004 can include milk carton 1006, egg carton 1008, and fruit 1010. Self-aware light 1002 can determine objectives related to refrigerator 1004. In one example, self-aware light 1002 can be pre-configured with objectives from a manufacturer of refrigerator 1004. In another example, self-aware light 1002 can employ artificial intelligence to determine objectives related to refrigerator 1004.

In an example, self-aware light 1002 can employ instruments 510 for detecting status (e.g. level remaining, empty, full) of refrigerator 1004 contents. Based on the status of the refrigerator contents, self-aware light 1002 can generate a shopping list for refrigerator contents and convey (e.g., audio, visual, transmit to user device, etc.) the shopping list to an operator, or can purchase the items directly from a delivery service. For example, self-aware light 1002 can determine that milk carton 1006 is unopened and is full, and determine that egg carton 1008 is half empty and take an appropriate shopping or notification action. In another example, self-aware light 1002 can determine that fruit 1010 is spoiled, and alert an operator to remove fruit 1010 from refrigerator 1004.

Figure 11:
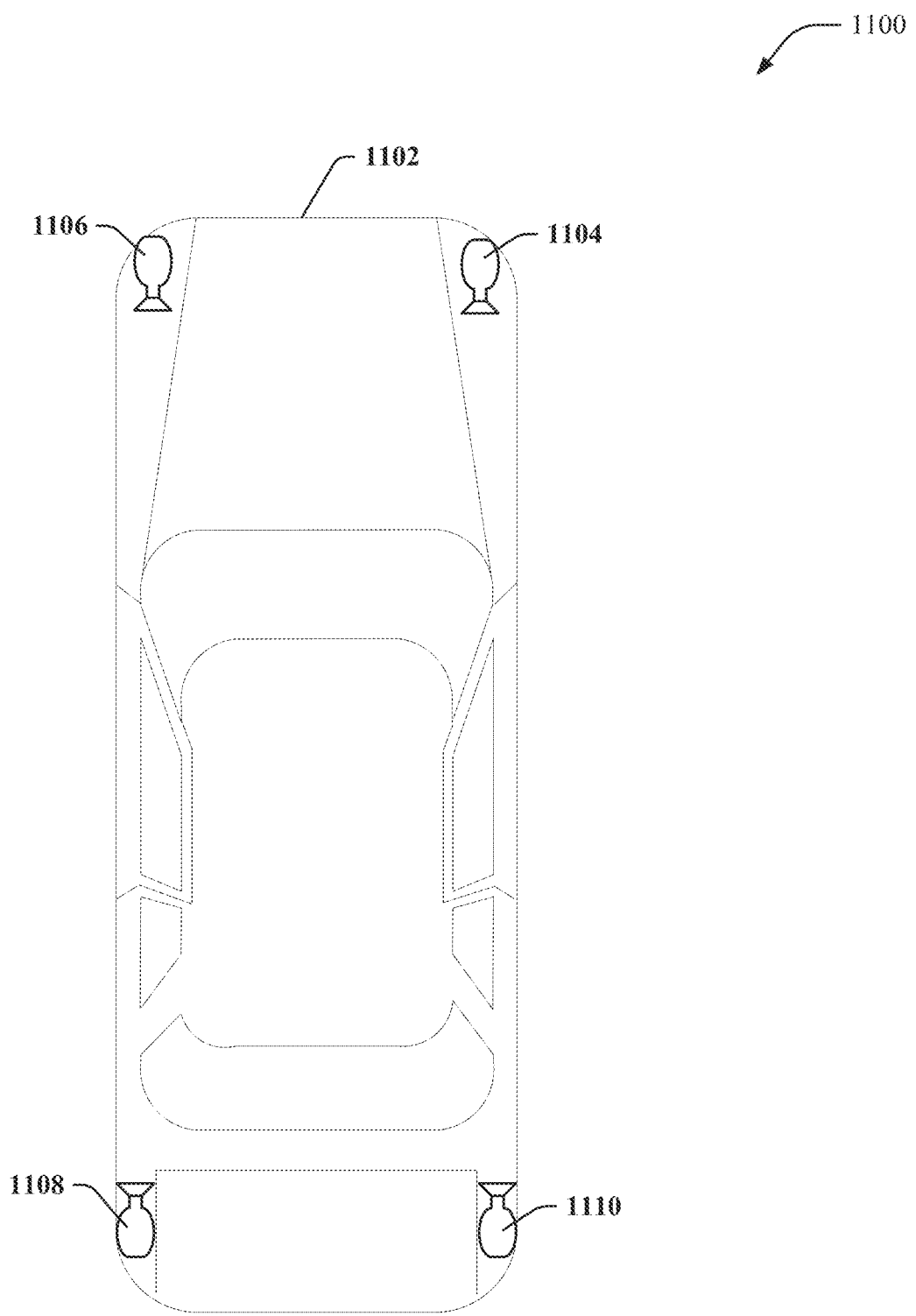
FIG. 11 illustrates a block diagram of an example, non-limiting environment in which self-aware lights are installed in accordance with one or more embodiments described herein.

FIG. 11 illustrates a block diagram of an example, non-limiting environment 1100 which includes a car 1102 in which self-aware lights 1104, 1106, 1108, and 1110 are installed in accordance with one or more embodiments described herein. Self-aware lights 1104, 1106, 1108, and 1110 can be or include portions of self-aware light 502. For example, self-aware lights 1104, 1106, 1108, and 1110 can be self-aware light bulb 102 installed as a retrofit into a light fixture 114 in car 1102. In another example, self-aware lights 1104, 1106, 1108, and 1110 can be self-aware light 200 where self-aware light fixture 202 replaces a light fixture 114 in car 1102 and has self-aware light bulb 102 installed. For example, self-aware lights 1104 and 1106 can replace headlights on car 1102, and self-aware lights 1108 and 1110 can replace taillights on car 1102. Self-aware lights 1104, 1106, 1108, and 1110 can determine objectives related to car 1102. In one example, self-aware lights 1104, 1106, 1108, and 1110 can be pre-configured with objectives from a manufacturer of car 1102. In another example, self-aware lights 1104, 1106, 1108, and 1110 can employ artificial intelligence to determine objectives related to car 1102.

In an example, self-aware lights 1104, 1106, 1108, and 1110 can employ instruments 510 to detect context of the car 1102 while it is operating, and adjust a lighting output of self-aware lights 1104, 1106, 1108, and 1110 according to the context. For example, self-aware lights 1104, 1106, 1108, and 1110 can detect weather and/or ambient lighting conditions and adjust light output to enhance driver visibility based on the weather and/or ambient lighting conditions. In another example, self-aware lights 1104 and 1106 can detect an oncoming vehicle and automatically turn down high-beam lamps. In a further example, self-aware lights 1104, 1106, 1108, and 1110 can employ instruments 510 to add safety functionality to car 1102, such as lane departure warning, collision warning, blind-spot warning, backup camera, parking assist, adaptive cruise control, adaptive braking, autonomous driving. For example, self-aware lights 1104, 1106, 1108, and 1110 can communicate with computers, navigation systems, speakers, and displays in car 1102 or occupant's user devices to implement the added safety functionality.

Referring back to FIG. 5, self-aware light 502 can implement a variety of functionality in various embodiments. For example, self-aware light 502 can determine its own operational state (e.g. fault, nearing end of life, etc.) and re-order a replacement or schedule service based on its operational state. In another example, self-aware light 502 can employ pattern/facial recognition to determine a person/activity in the environment and adjust its operation to a preference of the person or for the activity, such as appropriate lighting. For example, if a person is watching a movie self-aware light 502 can dim the lights, or if the person is cooking self-aware light 502 can brighten the lights. In another example, self-aware light 502 can determine there is a party with music playing and dynamically adjust its lighting to the beat of the music. In further example, self-aware light 502 can employ pattern recognition to determine a pest (e.g. insect, rodent, etc.) in the environment and adjust lighting and/or employ tools to repel the pest.

Self-aware light 502 can also employ its sensors to detect control commands (e.g. gesture, voice, motion) from an operator or other device to control operation of self-aware light 502. In another example, self-aware light 502 can employ its communication devices and/or tools to control other devices in the ecosystem. For example, when one self-aware light 502 in a foyer detects a person walking in the front door, self-aware light 502 can communicate with another self-aware light 502 in a family room to use a tool (e.g. infrared blaster) to turn on a television to a favorite channel of the person. In another example, at night a self-aware light 502 installed on a sideboard of a bed can detect a person getting out of bed, and turn on its lighting sufficient for the person to see, but not to wake up another person in the room, and can communicate with another self-aware light 502 in a bathroom to turn on its light for the person. In a further example, one or more self-aware lights 502 can be controlled through a social network. For example, in a nightclub, patrons can vote on the operation (e.g. color, pattern, etc.) of the one or more self-aware lights 502. Patrons could vote through voice, cheers, clapping, an app, or any other suitable input mechanism.

A set of self-aware lights 502 in a building can capture a set of images of the interior/exterior of the building and construct (e.g. stitch together images) a detailed three-dimensional view of the interior/exterior of the building that can be navigated in a viewer. Self-aware light 502 has artificial intelligence capabilities and can communicate with other devices 518 to determine actions to perform to enhance operations of the other devices. For example, the self-aware light 502 can communicate with devices in its area to identify devices 518 in an ecosystem. Self-aware light 502 can act as a master and/or slave for these devices 518 to enhance their functionality. A set of self-aware lights can operate in a coordinated manner to enhance operations of the other devices 518.

For example, self-aware light 502 can communicate with a camera to determine that the camera is about to take a picture and receive information from the camera about an object/scene of focus, as well as, camera settings. Self-aware light 502 can optimize lighting output to enhance a picture being taken according to the object/scene of focus and/or camera settings. In a further example, a set of self-aware lights 502 can operate in a coordinated manner to enhance the picture being taken.

In another example, self-aware light 502 in a desk lamp can communicate with a mobile phone sitting on the desk and determine battery power level of the phone, and if needed, self-aware light 502 can wirelessly charge the phone using a wireless power transfer mechanism.

In an additional example, self-aware light 502 can communicate with a Wi-Fi base station and act as a Wi-Fi access point/repeater. A plurality of self-aware lights 502 can communicate with each other to act as Wi-Fi access point/ repeater to fill an area with Wi-Fi coverage. For example, a self-aware light 502 can detect Wi-Fi signal strength in a defined area and enable its Wi-Fi access point/repeater function to improve signal strength in the defined.

In a further example, a self-aware light 502 can act as a communication device for a person. For example, a person can instruct the self-aware light 502 to send a message (e.g. text, voice, etc.) to another person.

In an additional example, a self-aware light 502 can employ a very high speed data transfer mechanism (e.g. Li-Fi) to transfer content to a device 518. For example, a self-aware light 502 can transfer a movie to a television, laptop, tablet, or cell phone using a Li-Fi for playback.

In another example, one or more self-aware lights 502 can employ their processing capabilities to offload or enhance processing operations of another device 518 communicating with the one or more self-aware lights 502.

In a further example, a set of self-aware lights 502 in a building can employ their processing, memory, and/or communication capabilities to act as a cloud platform for the building.

In an additional example, self-aware light 502 can take an analog input, convert to digital output, and employ artificial intelligence with a library of functions/templates for self configuration and/or self-operation.

In another example, self-aware light 502 can provide a user-interface that enables an operator to create lighting palettes (e.g. templates) that comprise preconfigured lighting output patterns, hues, movements, intensities, or any other suitable lighting attribute from one or more self-aware lights 502. These palettes can be stored in a library and reused in different environments. For example, a palette created in one environment can be transported an used in another environment. In another example, a palette can be shared by one operator to another operator. It is to be appreciated that the user interface can employed for web-based control of self-aware light 502 by an operator.

While FIGS. 5, 6, 7, and 8 depict separate components in self-aware light 502, it is to be appreciated that two or more components can be implemented in a common component. Further, it is to be appreciated that the design of the self-aware light 502 can include other component selections, component placements, etc., to facilitate determining characteristics of the environment in which the self-aware light 502 is installed, determining capabilities of self-aware light 502, determining one or more objectives of the installation of self-aware light 502, performing a self-configuration of self-aware light 502 according to the determined one or more objectives, and determining and executing suitable actions for self-aware light 502 to perform to achieve the determined one or more objectives in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to determining characteristics of the environment in which the self-aware light 502 is installed, determining capabilities of self-aware light 502, determining one or more objectives of the installation of self-aware light 502, performing a self-configuration of self-aware light 502 according to the determined one or more objectives, and determining and executing suitable actions for self-aware light 502 to perform to achieve the determined one or more objectives. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for determining characteristics of the environment in which the self-aware light 502 is installed, determining capabilities of self-aware light 502, determining one or more objectives of the installation of self-aware light 502, performing a self-configuration of self-aware light 502 according to the determined one or more objectives, and determining and executing suitable actions for self-aware light 502 to perform to achieve the determined one or more objectives by improving processing efficiency among processing components in these systems, reducing delay in processing performed by the processing components, reducing memory requirements, and/or improving the accuracy in which the processing systems are determining characteristics of the environment in which the self-aware light 502 is installed, determining capabilities of self-aware light 502, determining one or more objectives of the installation of self-aware light 502, performing a self-configuration of self-aware light 502 according to the determined one or more objectives, and determining and executing suitable actions for self-aware light 502 to perform to achieve the determined one or more objectives.

It is to be appreciated that the any criteria or thresholds disclosed herein can be pre-defined, operator specified, and/or dynamically determined, for example, based on learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 12:
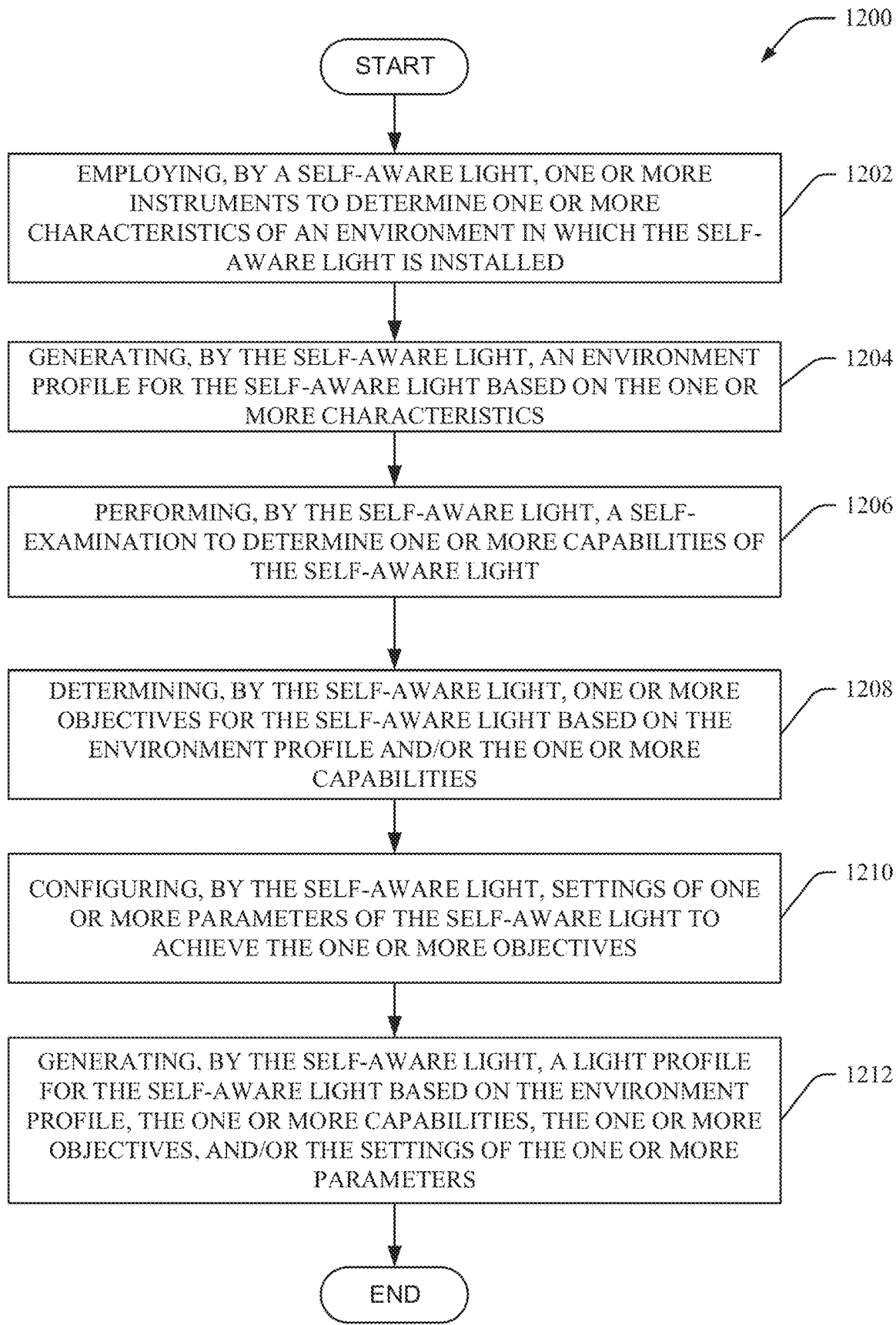
FIG. 12 illustrates a flow diagram of an example, non-limiting computer-implemented method that facilitates self-configuration of a self-aware light in accordance with one or more embodiments described herein.

FIG. 12 illustrates a flow diagram of an example, non-limiting computer-implemented method 1200 that facilitates self-aware light 502 determining characteristics of the environment in which the self-aware light 502 is installed, determining capabilities of self-aware light 502, determining one or more objectives of the installation of self-aware light 502, and performing a self-configuration of self-aware light 502 according to the determined one or more objectives in accordance with one or more embodiments described herein. Repetitive description of like elements employed in other embodiments described herein is omitted for sake of brevity.

At 1202, method 1200 comprises employing, by self-aware light, one or more instruments to determine one or more characteristics of an environment in which the self-aware light is installed (e.g., via physical environment component 702, network environment component 704, environment component 602, awareness component 504, and/or self-aware light 502). At 1204, method 1200 comprises generating, by the self-aware light, an environment profile for the self-aware light based on the one or more characteristics (e.g., via environment profile component 706, environment component 602, awareness component 504, and/or self-aware light 502). At 1206, method 1200 comprises performing, by the self-aware light, a self-examination to determine one or more capabilities of the self-aware light (e.g., via capability component 802, self-configuration component 604, awareness component 504, and/or self-aware light 502). At 1208, method 1200 comprises determining, by the self-aware light, one or more objectives for the self-aware light based on the environment profile and/the one or more capabilities (e.g., via objective component 804, self-configuration component 604, awareness component 504, and/or self-aware light 502). At 1210, method 1200 comprises configuring, by the self-aware light, settings of one or more parameters of the self-aware light to achieve the one or more objectives (e.g., via light profile component 806, self-configuration component 604, awareness component 504, and/or self-aware light 502). At 1212, method 1200 comprises generating, by the self-aware light, a light profile for the self-aware light based on the environment profile, the one or more capabilities, the one or more objectives, and/or the settings of the one or more parameters (e.g., via light profile component 806, self-configuration component 604, awareness component 504, and/or self-aware light 502).

Figure 13:
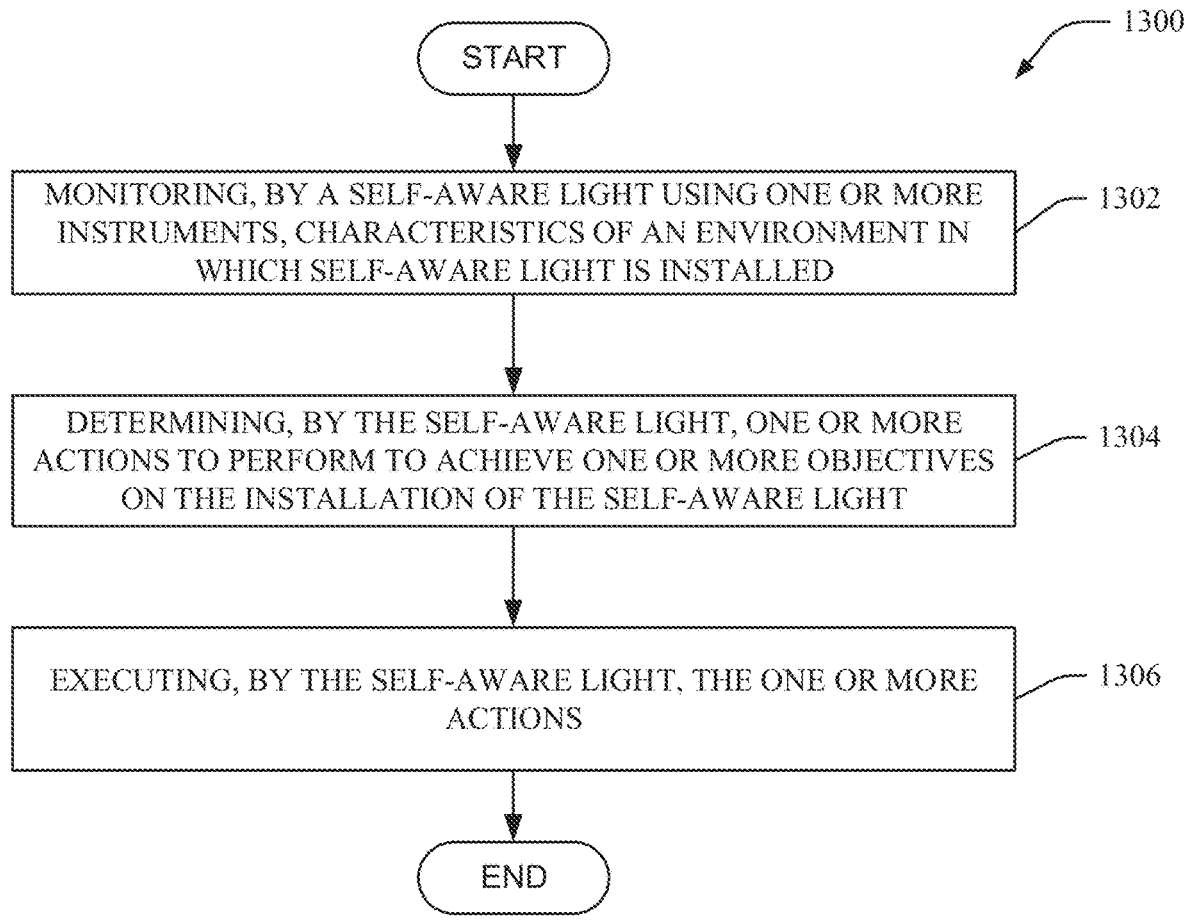
FIG. 13 illustrates a flow diagram of an example, non-limiting computer-implemented method that facilitates operation of a self-aware light in accordance with one or more embodiments described herein.

FIG. 13 illustrates a flow diagram of an example, non-limiting computer-implemented method 1300 that facilitates self-aware light 502 determining and executing suitable actions for self-aware light 502 to perform to achieve the determined one or more objectives in accordance with one or more embodiments described herein. Repetitive description of like elements employed in other embodiments described herein is omitted for sake of brevity.

At 1302, method 1300 comprises monitoring, by a self-aware light using one or more instruments, characteristics of an environment in which self-aware light is installed (e.g., via operation component 606, awareness component 504, and/or self-aware light 502). At 1304, method 1300 comprises determining, by the self-aware light, one or more actions to perform to achieve one or more objectives on the installation of the self-aware light (e.g., via operation component 606, awareness component 504, and/or self-aware light 502). At 1306, method 1300 comprises executing, by the self-aware light, the one or more actions (e.g., via operation component 606, awareness component 504, and/or self-aware light 502).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 14:
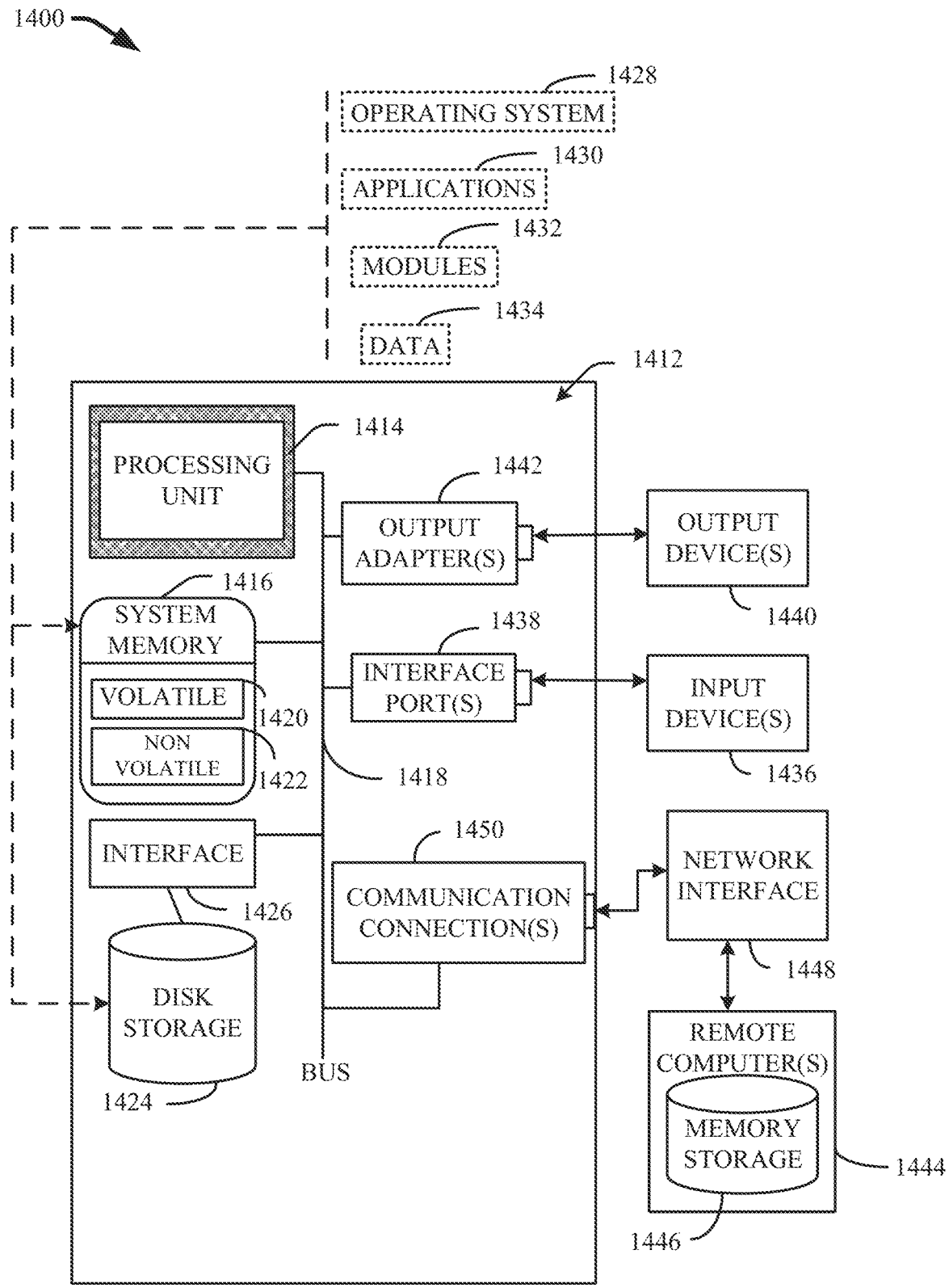
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment in which one or more embodiments described herein can be facilitated. Repetitive description of like elements employed in other embodiments described herein is omitted for sake of brevity.

With reference to FIG. 14, a suitable operating environment 1400 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1494), and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/nonvolatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB).

Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/ software employed to connect the network interface 1448 to the system bus 1418. While communication connection 1450 is shown for illustrative clarity inside computer 1412, it can also be external to computer 1412. The hardware/ software for connection to the network interface 1448 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A self-aware light bulb configured for installation in a light fixture, the self-aware light bulb comprising:
   one or more instruments physically removably coupled to a system bus of the self-aware light bulb;
   a memory that stores computer executable components; and
   a processor that executes the computer executable components stored in the memory, wherein the computer executable components comprise:
      a capability component that performs a self-examination of the self-aware light bulb, wherein the self-examination probes the system bus to determine the one or more instruments physically removably coupled to the system bus, and one or more capabilities of the one or more instruments of the self-aware light bulb; and
   an awareness component that:
      generates one or more objectives for the self-aware bulb based on the one or more capabilities of one or more instruments of the self-aware light bulb; and
      configures at least one setting of at least one parameter of the self-aware light bulb to achieve the one or more objectives.

2. The self-aware light bulb of claim 1, further comprising an operation component that:
   monitors an environment in which the self-aware light bulb is installed using the one or more instruments;
   determines one or more actions to perform to achieve the one or more objectives; and
   executes the one or more actions.

3. The self-aware light bulb of claim 2, wherein the one or more actions comprises coordination with at least one other self-aware light bulb to execute the one or more actions.

4. The self-aware light bulb of claim 2, wherein the one or more actions comprises employment of a tool included in the one or more instruments.

5. The self-aware light bulb of claim 2, wherein the one or more actions comprises the operation component executing control of a device in an environment in which self-aware light bulb is installed.

6. The self-aware light bulb of claim 1, wherein the one or more instruments comprises a plurality of different instruments.

7. The self-aware light bulb of claim 1, wherein the awareness component determines the one or more objectives further based on one or more characteristics of an environment in which the self-aware light bulb is installed.

8. A self-aware light comprising:
   a self-aware light fixture;
   a self-aware light bulb configured for installation in the self-aware light fixture;
   one or more instruments physically removably coupled to at least one system bus of at least one of the self-aware light bulb or the self-aware light fixture;
   a memory that stores computer executable components; and
   a processor that executes the computer executable components stored in the memory, wherein the computer executable components comprise:
      a capability component that performs a self-examination of the self-aware light bulb, wherein the self-examination probes the at least one system bus to determine the one or more instruments physically removably coupled to the at least one system bus, and one or more capabilities of the one or more instruments of the self-aware light bulb; and
   an awareness component that:
      generates one or more objectives for the self-aware bulb based on the one or more capabilities of the one or more instruments of the self-aware light bulb; and
      configures at least one setting of at least one parameter of the self-aware light bulb to achieve the one or more objectives.

9. The self-aware light of claim 8, further comprising an operation component that:

monitors an environment in which self-aware light bulb is installed using the one or more instruments;

determines one or more actions to perform to achieve the one or more objectives; and executes the one or more actions.

10. The self-aware light of claim 9, wherein the one or more actions comprises coordination with at least one other self-aware light bulb to execute the one or more actions.

11. The self-aware light of claim 9, wherein the one or more actions comprises employment of a tool included in the one or more instruments.

12. The self-aware light of claim 9, wherein the one or more actions comprises the operation component executing control of a device in an environment in which self-aware light bulb is installed.

13. The self-aware light of claim 8, wherein the one or more instruments comprises a plurality of different instruments.

14. The self-aware light of claim 8, wherein the awareness component determines the one or more objectives further based on one or more characteristics of an environment in which the self-aware light bulb is installed.

15. A method comprising:

probing, by a self-aware light bulb, a system bus of the self-aware light bulb to determine the one or more instruments physically removably coupled to the system bus, and;

determining, by the self-aware light bulb, one or more capabilities of one or more instruments physically removably coupled to the system bus of the self-aware light bulb based on the probing;

generating, by the self-aware light bulb, one or more objectives for the self-aware light bulb based on the one or more capabilities of the one or more instruments; and configuring, by the self-aware light bulb, at least one setting of at least one parameter of the self-aware light bulb to achieve the one or more objectives.

16. The method of claim 15, further comprising:

monitoring, by the self-aware light bulb, an environment in which the self-aware light bulb is installed using the one or more instruments;

determining, by the self-aware light bulb, one or more actions to perform to achieve the one or more objectives;

executing, by the self-aware light bulb, the one or more actions.

17. The method of claim 16, wherein the one or more actions comprises coordination with at least one other self-aware light bulb to execute the one or more actions.

18. The method of claim 16, wherein the one or more actions comprises employment of a tool included in the one or more instruments.

19. The method of claim 16, wherein the one or more actions comprises the operation component executing control of a device in an environment in which self-aware light bulb is installed.

20. The method of claim 15, wherein the determining the one or more objectives is further based on one or more characteristics of an environment in which the self-aware light bulb is installed.

* * * * *